United States Patent
Kitai et al.

(10) Patent No.: US 10,890,507 B2
(45) Date of Patent: Jan. 12, 2021

(54) STATE MONITORING METHOD AND STATE MONITORING APPARATUS

(71) Applicant: NTN Corporation, Osaka (JP)

(72) Inventors: Masashi Kitai, Kuwana (JP); Hideyuki Tsutsui, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/480,999

(22) PCT Filed: Dec. 26, 2017

(86) PCT No.: PCT/JP2017/046529
§ 371 (c)(1),
(2) Date: Jul. 25, 2019

(87) PCT Pub. No.: WO2018/139144
PCT Pub. Date: Aug. 2, 2018

(65) Prior Publication Data
US 2019/0391038 A1     Dec. 26, 2019

(30) Foreign Application Priority Data

Jan. 25, 2017 (JP) ................. 2017-011149
Jan. 25, 2017 (JP) ................. 2017-011150

(51) Int. Cl.
*G01M 7/02* (2006.01)
*G06N 20/10* (2019.01)

(52) U.S. Cl.
CPC .............. *G01M 7/02* (2013.01); *G06N 20/10* (2019.01)

(58) Field of Classification Search
None
See application file for complete search history.

(56) References Cited

U.S. PATENT DOCUMENTS

2012/0290879 A1   11/2012   Shibuya et al.
2013/0318011 A1   11/2013   Jones et al.
(Continued)

FOREIGN PATENT DOCUMENTS

| EP | 2884363 A2 | 6/2015 |
|----|-----------|--------|
| EP | 2897012 A1 | 7/2015 |
| JP | 2008197007 A | 8/2008 |

(Continued)

OTHER PUBLICATIONS

Jeff Hobert "Introduction to Machine Learning" University of Washington 2014 (Year: 2014).*
(Continued)

*Primary Examiner* — Roy Y Yi
(74) *Attorney, Agent, or Firm* — McDermott Will & Emery LLP

(57) ABSTRACT

A state monitoring method and a state monitoring apparatus which achieve a lower error rate are provided. Rather than collectively processing whole measurement data, the state monitoring apparatus divides the whole measurement data into a plurality of segments and processes each segment. From the measurement data, training data and test data to which an anomaly detection approach is to be applied is randomly selected. By repeatedly calculating an anomaly ratio and averaging the anomaly ratios, a result of discrimination is stabilized.

12 Claims, 21 Drawing Sheets

(56) References Cited

U.S. PATENT DOCUMENTS

2016/0076970 A1 3/2016 Takahashi
2017/0111378 A1* 4/2017 Caffrey ............... H04L 63/1408

FOREIGN PATENT DOCUMENTS

| JP | 5431235 B2 | 3/2014 |
| JP | 5780870 B2 | 9/2015 |
| JP | 2016062258 A | 4/2016 |

OTHER PUBLICATIONS

Meng et al. (Device-Agnostic Log Anomaly Classification with Partial Labels, IEEE, 2018). (Year: 2018).*
International Search Report issued in corresponding International Patent Application No. PCT/JP2017/046529, dated Mar. 27, 2018, with English translation.
Extended European Search Report issued in corresponding European Patent Application No. 17894199.3, dated Jun. 8, 2020.

* cited by examiner

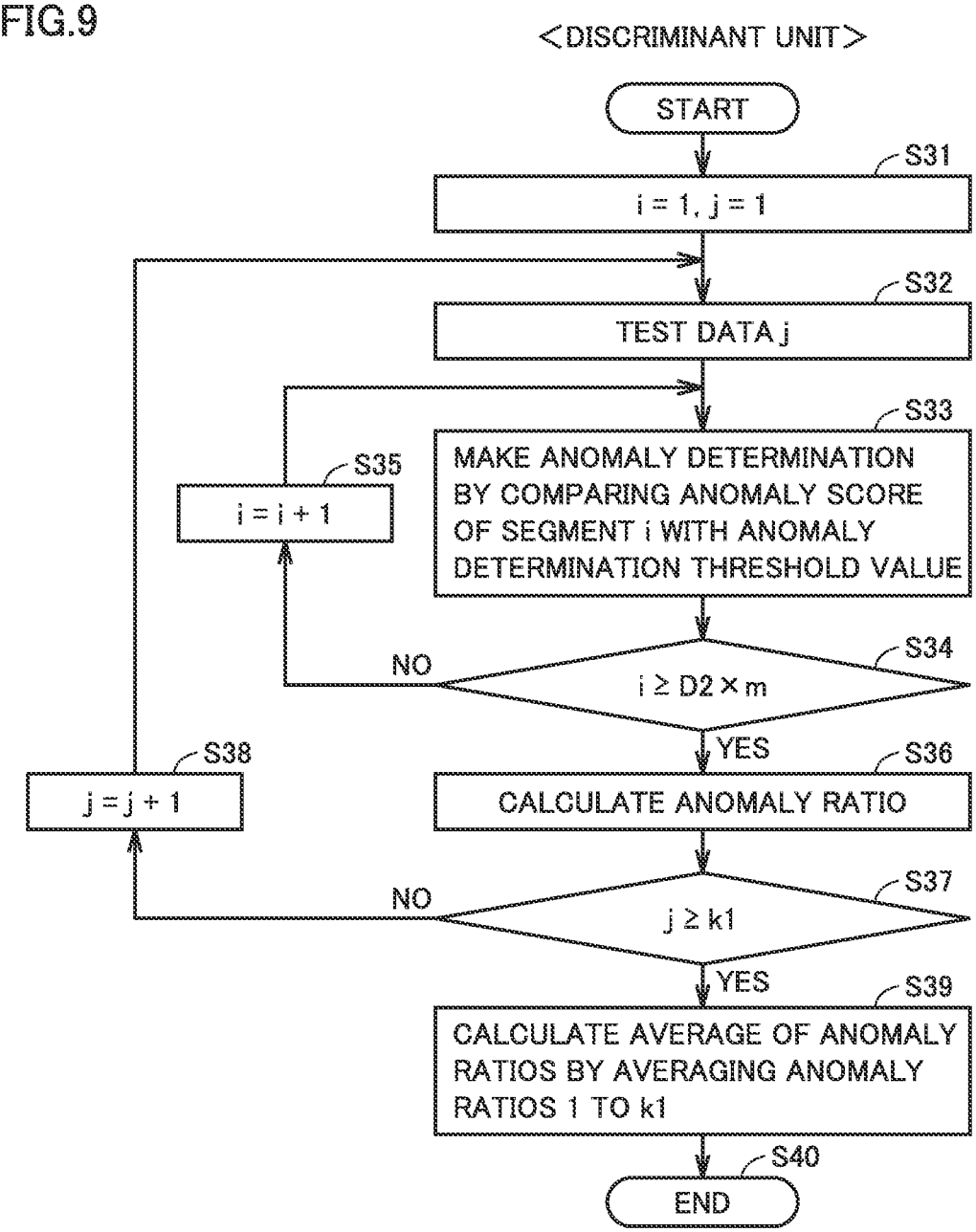

ANOMALY DISCRIMINATION RESULT

| DAMAGE SIZE | EXAMPLE 1 | EXAMPLE 2 | COMPARATIVE EXAMPLE |
|---|---|---|---|
| φ 0.00 mm | C | C | C |
| φ 0.34 mm | C | C | C |
| φ 0.68 mm | B | A | C |
| φ 1.02 mm | B | A | C |
| φ 1.35 mm | A | A | B |
| RECTANGULAR GROOVE | A | A | A |

AVERAGE OF ANOMALY RATIOS

| DAMAGE SIZE | EXAMPLE 1 | EXAMPLE 2 | COMPARATIVE EXAMPLE 1 | COMPARATIVE EXAMPLE 2 |
|---|---|---|---|---|
| 0mm | 0.08 | 0 | 0 | 0.15 |
| 0.34mm | 0 | 0.1 | 0 | 0.02 |
| 0.68mm | 0.35 | 0.8 | 0.02 | 0.3 |
| 1.02mm | 0.35 | 0.82 | 0 | 0.27 |
| 1.35mm | 0.57 | 1 | 0.04 | 0.45 |
| RECTANGULAR GROOVE | 1 | 1 | 1 | 1 |

STATE MONITORING METHOD AND STATE MONITORING APPARATUS

CROSS-REFERENCE TO RELATED APPLICATIONS

This application is the U.S. National Phase under 35 U.S.C. § 371 of International Application No. PCT/JP2017/046529, filed on Dec. 26, 2017, which claims the benefit of Japanese Application No. 2017-011150, filed on Jan. 25, 2017, and Japanese Application No. 2017-011149, filed Jan. 25, 2017, the entire contents of each are hereby incorporated by reference.

TECHNICAL FIELD

The present invention relates to a state monitoring method and a state monitoring apparatus.

BACKGROUND ART

A state of a rotary machine, facilities, and a plant including the same has conventionally been monitored by measuring a physical quantity by using various sensors.

A method of discriminating anomaly by preparing a normal model of a physical quantity and calculating how much a newly measured physical quantity deviates from the normal model is available as a method of monitoring a state (see, for example, PTL 1: Japanese Patent No. 5431235). A method of specifying anomaly by storing a value of a characteristic frequency peak generated by a damage in a bearing or runout of a shaft in a state monitoring system and observing variation in peak is also available (see, for example, PTL 2: Japanese Patent No. 5780870).

CITATION LIST

Patent Literature

PTL 1: Japanese Patent No. 5431235
PTL 2: Japanese Patent No. 5780870

SUMMARY OF INVENTION

Technical Problem

In a rotary machine affected by an operating condition or noise, however, a physical quantity is varied even in a normal state. Therefore, a physical quantity indicating anomaly may be buried in the normal model, or the normal state may erroneously be discriminated as anomaly depending on the prepared normal model.

A state monitoring approach capable of avoiding erroneous discrimination as much as possible and discriminating a small damage in a rotary machine affected by an operating condition or noise has been demanded.

This invention was made to solve the problems above, and an object thereof is to provide a state monitoring method and a state monitoring apparatus which achieve a lower error rate.

Solution to Problem

This invention is directed to a state monitoring method including a first step of obtaining a plurality of pieces of first measurement data of a first time length at timings different from one another from a sensor provided in a tested target while the tested target is normal, a second step of obtaining a plurality of pieces of second measurement data of the first time length at timings different from one another when the tested target is diagnosed, a third step of randomly selecting a plurality of pieces of training data from the plurality of pieces of first measurement data, a fourth step of randomly selecting a plurality of pieces of test data from the plurality of pieces of second measurement data, a fifth step of dividing each of the plurality of pieces of training data into pieces of segment data of a second time length shorter than the first time length and preparing a first feature value vector including a plurality of feature values for each divided piece of segment data, a sixth step of preparing a classification boundary between normal and anomaly and an anomaly discriminant threshold value from a plurality of first feature value vectors prepared for each piece of segment data for the plurality of pieces of training data, a seventh step of dividing each of the plurality of pieces of test data into pieces of segment data of the second time length and preparing a second feature value vector including a plurality of feature values for each divided piece of segment data, an eighth step of calculating an anomaly score representing a distance from the classification boundary for the second feature value vector and calculating, for each of the plurality of pieces of test data, an anomaly ratio representing a ratio of the number of anomaly scores of the second feature value vectors exceeding the anomaly discriminant threshold value to a total number of the second feature value vectors, and a ninth step of repeating the third to eighth steps a plurality of times and discriminating the tested target as being abnormal when an average value of obtained anomaly ratios exceeds a prescribed value.

A state monitoring method in another aspect of this invention includes a first step of obtaining a plurality of pieces of first measurement data of a first time length at timings different from one another from a sensor provided in a tested target while the tested target is normal, a second step of obtaining a plurality of pieces of second measurement data of the first time length at timings different from one another when the tested target is diagnosed, a third step of randomly selecting a plurality of pieces of training data from the plurality of pieces of first measurement data, a fourth step of randomly selecting a plurality of pieces of test data from the plurality of pieces of second measurement data, a fifth step of preparing a third feature value vector by dividing each of the plurality of pieces of training data into pieces of segment data of a second time length shorter than the first time length, preparing a first feature value vector including a plurality of feature values for each divided piece of segment data, and handling together the first feature value vectors of a plurality of successive pieces of segment data, a sixth step of preparing a classification boundary between normal and anomaly and an anomaly discriminant threshold value from a plurality of third feature value vectors prepared for each set of the plurality of successive pieces of the segment data for the plurality of pieces of training data, a seventh step of preparing a fourth feature value vector by dividing each of the plurality of pieces of test data into pieces of segment data of the second time length, preparing a second feature value vector including a plurality of feature values for each divided piece of segment data, and handling together the second feature value vectors of a plurality of successive pieces of segment data, an eighth step of calculating an anomaly score representing a distance from the classification boundary for the fourth feature value vector and calculating, for each of the plurality of pieces of test data, an anomaly ratio representing a ratio of the number of anomaly scores of the fourth feature value vectors exceeding the anomaly discriminant threshold value to a total number of the fourth feature value vectors, and a ninth step of repeating the third to eighth steps a plurality of times and discriminating the tested target as being abnormal when an average value of obtained anomaly ratios exceeds a prescribed value.

A state monitoring method in yet another aspect of this invention includes a first step of obtaining a plurality of pieces of first measurement data of a first time length at timings different from one another from a sensor provided in a tested target while the tested target is normal, a second step of obtaining a plurality of pieces of second measurement data of the first time length at timings different from one another when the tested target is diagnosed, a third step of randomly selecting a plurality of pieces of training data from the plurality of pieces of first measurement data, a fourth step of randomly selecting a plurality of pieces of test data from the plurality of pieces of second measurement data, a fifth step of dividing each of the plurality of pieces of training data into pieces of segment data of a second time length shorter than the first time length and preparing, for each divided piece of segment data, a first feature value vector including each of a plurality of calculated feature values as a component, a sixth step of preparing a second feature value vector for each piece of segment data by calculating an indicator value representing variation for each component of the first feature value vector, determining a component of which indicator value is smaller than a sampling threshold value as a component to be used, and sampling the component to be used from the first feature value vector, a seventh step of preparing a classification boundary between normal and anomaly and an anomaly discriminant threshold value from a plurality of second feature value vectors prepared for each piece of segment data for the plurality of pieces of training data, an eighth step of dividing each of the plurality of pieces of test data into pieces of segment data of the second time length and preparing, for each divided piece of segment data, a third feature value vector including each of the plurality of calculated feature values as a component, a ninth step of preparing a fourth feature value vector for each piece of segment data by sampling the component to be used from the third feature value vector, a tenth step of calculating an anomaly score representing a distance from the classification boundary for the fourth feature value vector and calculating, for each of the plurality of pieces of test data, an anomaly ratio representing a ratio of the number of anomaly scores of the fourth feature value vectors exceeding the anomaly discriminant threshold value to a total number of the fourth feature value vectors, and an eleventh step of repeating the third to tenth steps a plurality of times and discriminating the tested target as being abnormal when an average value of obtained anomaly ratios exceeds a prescribed value.

A state monitoring method in still another aspect of this invention includes a first step of obtaining a plurality of pieces of first measurement data of a first time length at timings different from one another from a sensor provided in a tested target while the tested target is normal, a second step of obtaining a plurality of pieces of second measurement data of the first time length at timings different from one another when the tested target is diagnosed, a third step of randomly selecting a plurality of pieces of training data from the plurality of pieces of first measurement data, a fourth step of randomly selecting a plurality of pieces of test data from the plurality of pieces of second measurement data, a fifth step of preparing a second feature value vector by dividing each of the plurality of pieces of training data into pieces of segment data of a second time length shorter than the first time length, preparing, for each divided piece of segment data, a first feature value vector including each of a plurality of calculated feature values as a component, and handling together the first feature value vectors of a plurality of successive pieces of segment data, a sixth step of preparing a third feature value vector for each set of the plurality of successive pieces of segment data by calculating an indicator value representing variation for each component of the second feature value vector, determining a component of which indicator value is smaller than a sampling threshold value as a component to be used, and sampling the component to be used from the second feature value vector, a seventh step of preparing a classification boundary between normal and anomaly and an anomaly discriminant threshold value from a plurality of the third feature value vectors prepared for each set of the plurality of successive pieces of segment data for the plurality of pieces of training data, an eighth step of preparing a fifth feature value vector by dividing each of the plurality of pieces of test data into pieces of segment data of the second time length, preparing, for each divided piece of segment data, a fourth feature value vector including each of a plurality of calculated feature values as a component, and handling together the fourth feature value vectors of a plurality of successive pieces of segment data, a ninth step of preparing a sixth feature value vector for each set of the plurality of successive pieces of segment data by sampling the component to be used from the fifth feature value vector, a tenth step of calculating an anomaly score representing a distance from the classification boundary for the sixth feature value vector and calculating, for each of the plurality of pieces of test data, an anomaly ratio representing a ratio of the number of anomaly scores of the sixth feature value vectors exceeding the anomaly discriminant threshold value to a total number of the sixth feature value vectors, and an eleventh step of repeating the third to tenth steps a plurality of times and discriminating the tested target as being abnormal when an average value of obtained anomaly ratios exceeds a prescribed value. The indicator value is, for example, a coefficient of variance.

In another aspect, this invention is directed to a state monitoring apparatus which diagnoses a tested target by using any method described above.

Advantageous Effects of Invention

According to the state monitoring method in the present invention, anomaly of a monitored apparatus affected by an operating condition or noise can more promptly be discriminated based on measurement data, and accuracy of a state monitoring system can be improved.

BRIEF DESCRIPTION OF DRAWINGS

FIG. 9 is a flowchart for illustrating processing performed by a discriminant unit in the first embodiment.

DESCRIPTION OF EMBODIMENTS

Figure 1:
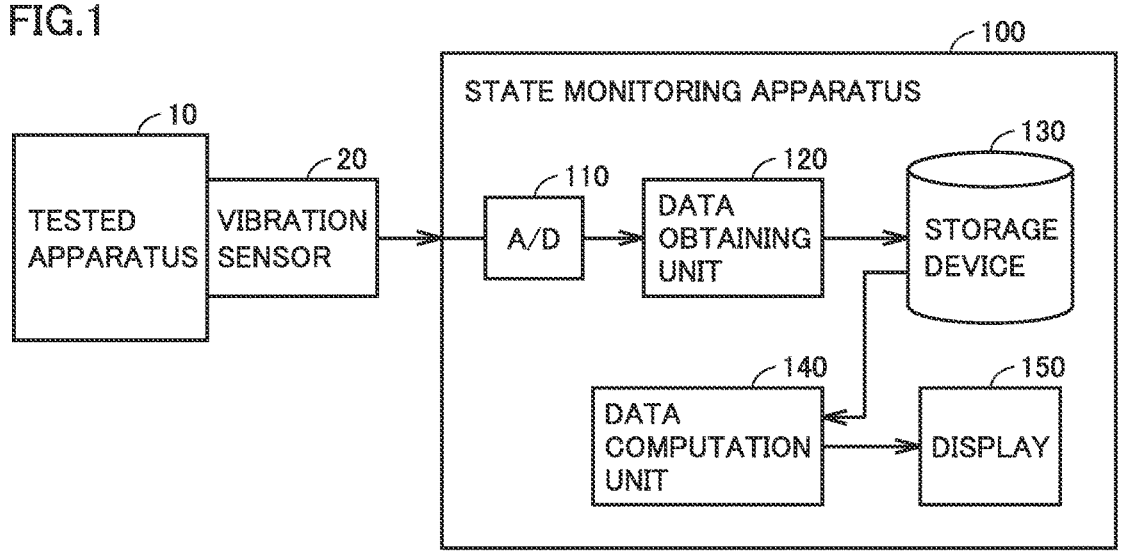
FIG. 1 is a block diagram showing a configuration of a state monitoring apparatus according to the present embodiment.

An embodiment of the present invention will be described below with reference to the drawings. The same or corresponding elements in the drawings below have the same reference characters allotted and description thereof will not be repeated.

Basic Configuration of State Monitoring Apparatus

FIG. 1 is a block diagram showing a configuration of a state monitoring apparatus according to the present embodiment. Referring to FIG. 1, a state monitoring apparatus 100 monitors a state of a tested apparatus 10 and detects anomaly by receiving a signal from a vibration sensor 20 provided in tested apparatus 10. For example, facilities including a rotary machine provided in a factory or a power plant are defined as tested apparatus 10, and vibration sensor 20 can detect abnormal vibration generated during rotation. Though vibration is given as an exemplary target to be monitored in the present embodiment, a detection signal other than a signal from the vibration sensor may be applicable so long as it is an output signal on which checking of an operating condition of facilities can be based. For example, a sensor which detects sound, a temperature, load torque, or motor power may be employed instead of vibration sensor 20.

State monitoring apparatus 100 includes an A/D converter 110, a data obtaining unit 120, a storage device 130, a data computation unit 140, and a display 150.

A/D converter 110 receives a signal output from vibration sensor 20. Data obtaining unit 120 receives a digital signal from A/D converter 110, performs filtering processing, and has storage device 130 record measurement data. Data computation unit 140 reads from storage device 130, measurement data obtained while the tested apparatus is normal, and prepares an anomaly discriminant threshold value for making anomaly discrimination or determines, by using the anomaly discriminant threshold value, whether or not tested apparatus 10 is abnormal based on measurement data obtained during a test. When data computation unit 140 makes anomaly determination, it has display 150 show a result thereof.

Figure 2:
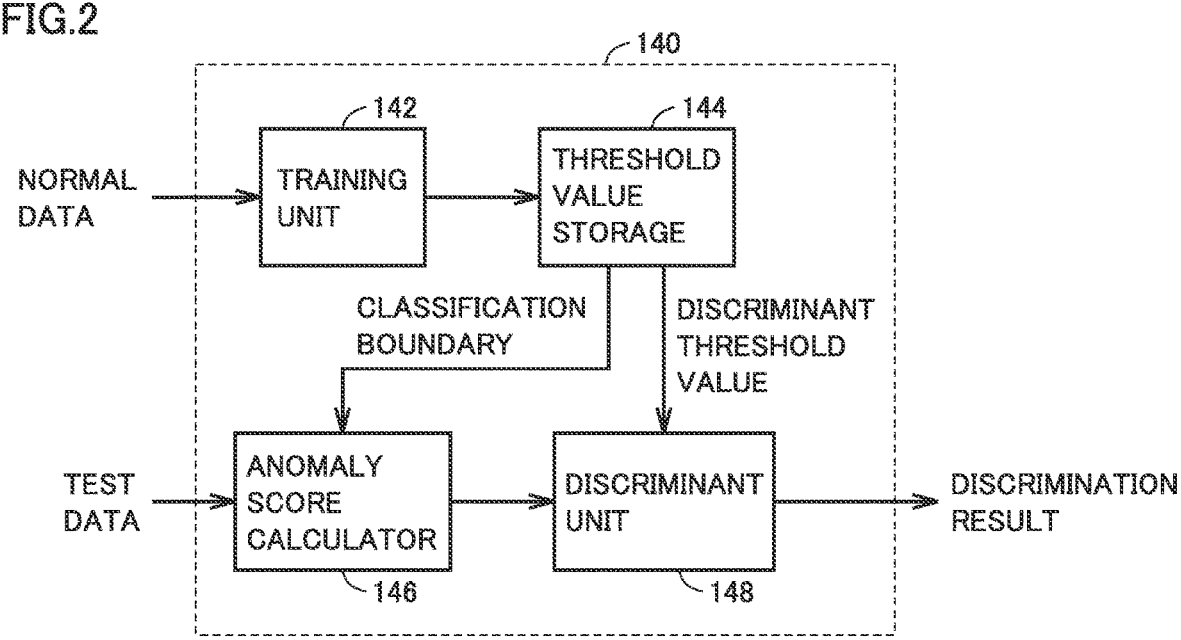
FIG. 2 is a block diagram showing details of a data computation unit.

FIG. 2 is a block diagram showing details of the data computation unit. Data computation unit 140 includes a training unit 142, a threshold value storage 144, an anomaly score calculator 146, and a discriminant unit 148.

Training unit 142 generates a classification boundary representing a boundary between normal and anomaly based on data (normal data) obtained from storage device 130 while tested apparatus 10 is normal (an initial state or the like) and an anomaly discriminant threshold value for discriminating an anomaly score corresponding to a distance from the classification boundary, and has the classification boundary and the anomaly discriminant threshold value stored in threshold value storage 144.

Anomaly score calculator 146 applies the classification boundary to data (test data) obtained from storage device 130 in diagnosis of tested apparatus 10 to calculate an anomaly score corresponding to a distance from the classification boundary, and sends the anomaly score to discriminant unit 148.

Discriminant unit 148 makes anomaly determination of tested apparatus 10 based on a result of comparison between the anomaly score and the anomaly discriminant threshold value.

First Embodiment

One of characteristics of state monitoring apparatus 100 in the present embodiment is that, in processing measurement data, it divides whole measurement data into a plurality of segments and performs processing for each segment, rather than collectively processing the whole measurement data. The segment will be described below.

Figure 3:
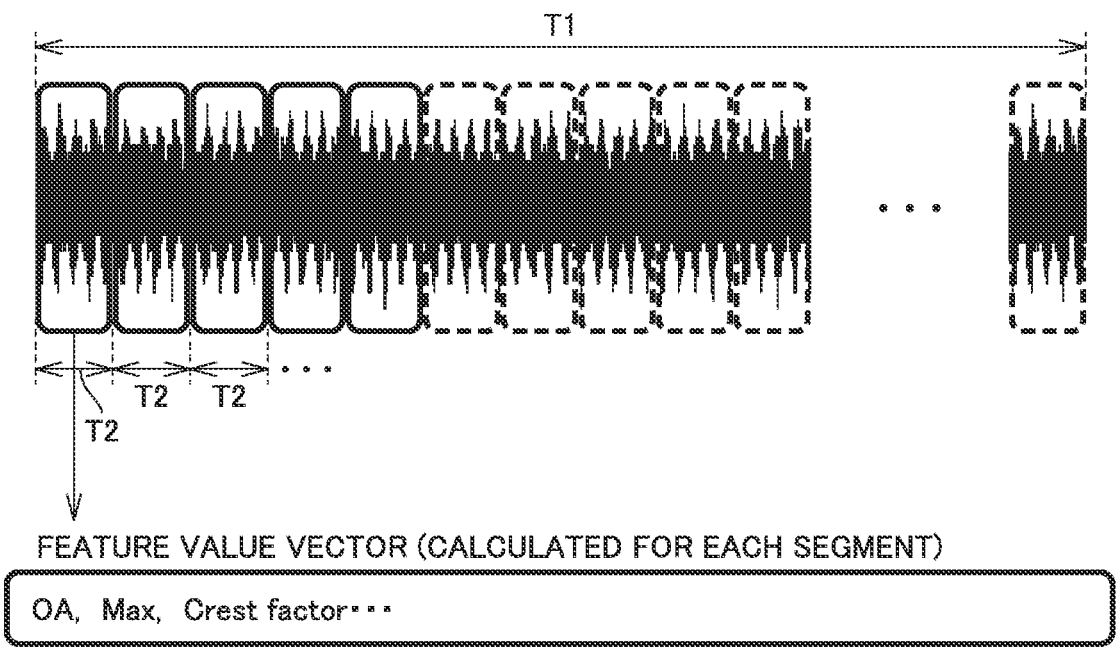
FIG. 3 is a conceptual diagram showing relation between measurement data and segment data in a first embodiment.

FIG. 3 is a conceptual diagram showing relation between measurement data and segment data. Referring to FIG. 3, measurement data is data of a time length T1, and it is data obtained by A/D conversion by A/D converter 110 of a signal output from vibration sensor 20 followed by filtering processing by data obtaining unit 120, and stored in storage device 130.

The measurement data stored in storage device 130 includes training data and test data. The training data refers to measurement data obtained while tested apparatus 10 has been known to be normal (for example, an initial state or the like). The test data refers to measurement data obtained when discrimination as to normal/abnormal of tested apparatus 10 is desired. The training data determines a classification boundary or an anomaly discriminant threshold value which will be described later. As a result of prescribed processing onto test data by using the classification boundary and the anomaly discriminant threshold value, whether tested apparatus 10 is normal or abnormal is determined.

When the measurement data of time length T1 is processed by training unit 142 and anomaly score calculator 146, it is divided into segments each having a time length T2 shorter than time length T1 as shown in FIG. 3. For example, when time length T1 is set to 20 seconds, time length T2 can be set to 0.2 second. In this case, one piece of measurement data is divided into 100 pieces of segment data. After the measurement data is divided, training unit 142 and anomaly score calculator 146 further prepare a feature value vector for each segment.

Figure 4:
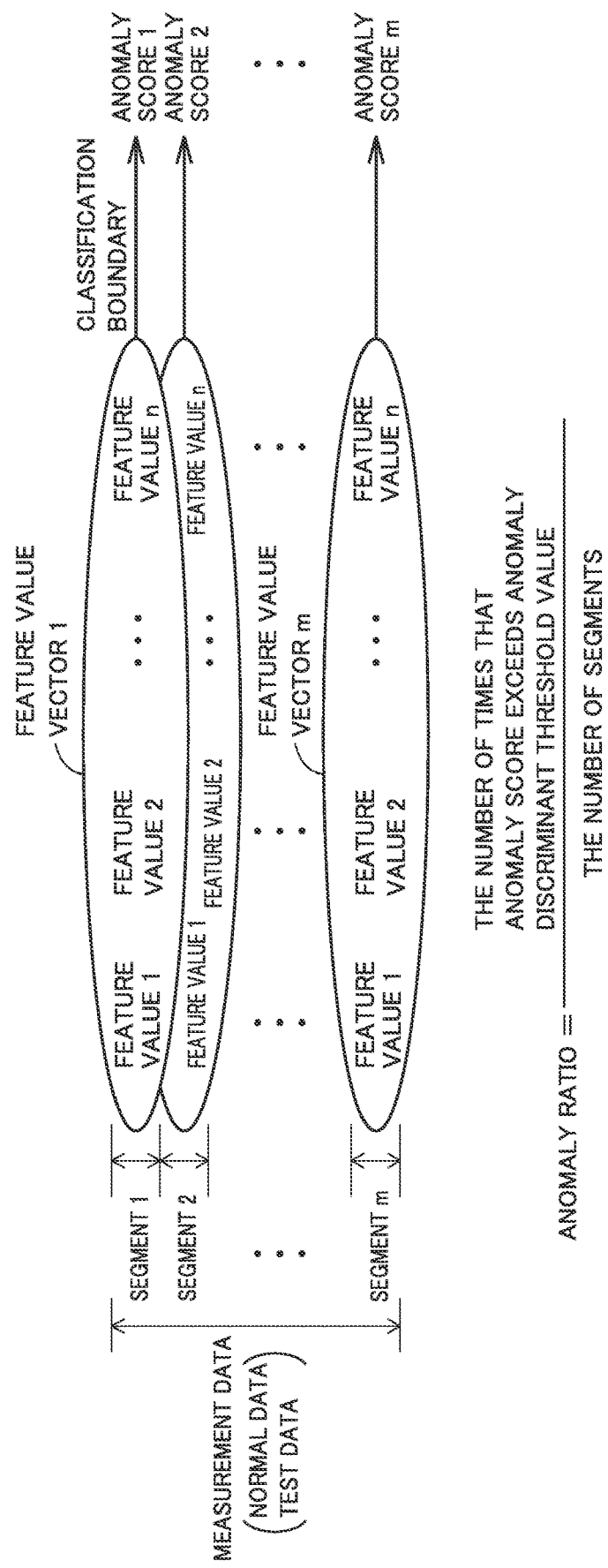
FIG. 4 is a diagram for illustrating a feature value vector.

FIG. 4 is a diagram for illustrating a feature value vector. FIG. 4 shows an example in which measurement data is divided into m segments and there are n feature values.

For example, when vibration is defined as measurement data, an overall value (OA), a maximum value (Max), a crest factor (Crest factor), a kurtosis, a skewness, and a value thereof subjected to signal processing (FFT processing, quefrency processing) can be defined as a feature value. A feature value vector means handling of a plurality of feature values as one set of vectors. These feature value vectors are used for anomaly determination. For one piece of measurement data, m feature value vectors 1 to m are prepared.

When whole measurement data is collectively used for processing for sampling of a feature value and preparation of a feature value vector, in case of occurrence of sudden anomaly, the whole measurement data may become unusable for diagnosis. Therefore, in the present embodiment, measurement data is divided into segments and a feature value is sampled and a feature value vector is calculated for each segment. For example, when a rotary machine is monitored by a vibration sensor, temporary impact such as drop of a tool while measurement data is being acquired may be detected by the vibration sensor as sudden vibration. Even in such a case, by sampling a feature value for each segment, a correct feature value can be sampled during a period other than sudden anomaly, and by comparing a feature value for each segment, evaluation can be made with a segment corresponding to sudden anomaly being excluded.

Anomaly scores 1 to m are computed for feature value vectors 1 to m, respectively, based on the classification boundary. The classification boundary is an indicator for making anomaly discrimination that is used in an already known anomaly detection approach (one class support vector machine: OC-SVM).

Figure 5:
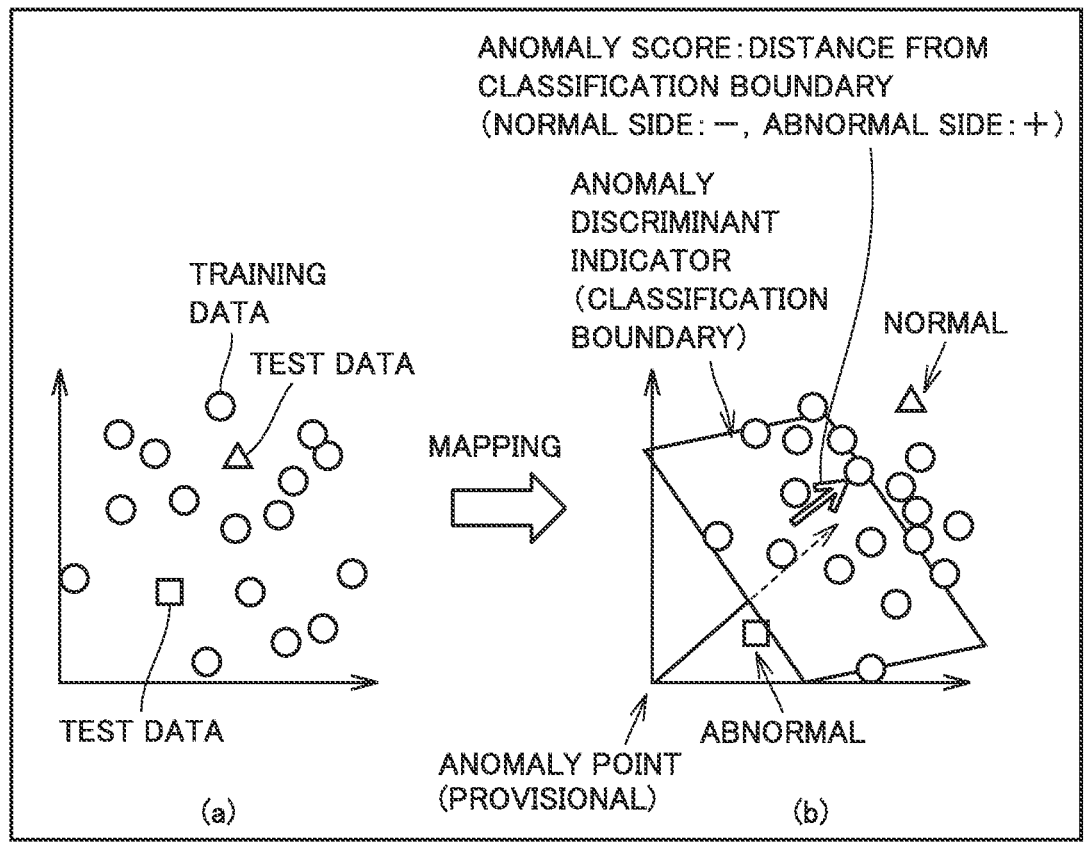
FIG. 5 is a diagram for illustrating a basic concept of OC-SVM.

FIG. 5 is a diagram for illustrating a basic concept of OC-SVM. A circle in FIG. 5 represents training data obtained for learning a normal state when tested apparatus 10 has been known to be normal, and a square and a triangle represent test data to be diagnosed. Test data shown with the square corresponds to data exhibiting anomaly and test data shown with the triangle corresponds to data exhibiting normal.

An example in which a boundary line between normal and anomaly cannot be drawn in training data and test data on a two-dimensional scatter plot where there are two feature values as shown in FIG. 5(a) on the left is considered. Since a useful feature value is different depending on a diagnosis target and an operation condition, an appropriate feature value is selected. By mapping each of training data and test data in a multi-dimensional feature space including an appropriate feature value, a classification boundary plane between normal and anomaly can be generated. An anomaly score representing a distance from the classification boundary can be calculated for each of training data and test data. The anomaly score is zero on the classification boundary, negative (−) on a normal side of the classification boundary, and positive (+) on the abnormal side.

Such an approach is called machine learning by OC-SVM, and many feature values can be converted to a single indicator (an anomaly score) to be used for evaluation.

Training unit 142 in FIG. 2 sets the classification boundary and sets an anomaly determination threshold value for determining an anomaly score of test data. Anomaly score calculator 146 in FIG. 2 calculates an anomaly score representing a distance of each piece of measurement data based on the classification boundary in a feature space. Discriminant unit 148 in FIG. 2 calculates an anomaly ratio of each piece of measurement data by comparing the anomaly score with the anomaly discriminant threshold value and outputs a result of discrimination.

Figure 6:
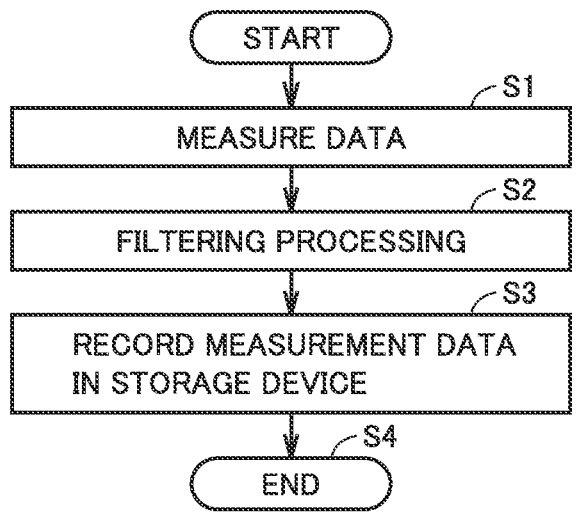
FIG. 6 is a flowchart for illustrating processing performed by a data obtaining unit in the first embodiment.

FIG. 6 is a flowchart for illustrating processing performed by the data obtaining unit in FIG. 1. Data obtaining unit 120 receives in step S1, data resulting from digital conversion of a signal including a vibration waveform from vibration sensor 20, subjects an abnormal phenomenon to be observed to appropriate filtering processing among low pass filtering, band pass filtering, and high pass filtering to achieve a basic noise-removed state in step S2, and has the data stored in storage device 130 in step S3.

Data obtaining unit 120 obtains training data when tested apparatus 10 has been known to normally operate, for example, when the tested apparatus is in an initial state or repair thereof has been completed, and it automatically obtains test data at time designated by a timer or the like when diagnosis is desired while tested apparatus 10 is being used.

Figure 7:
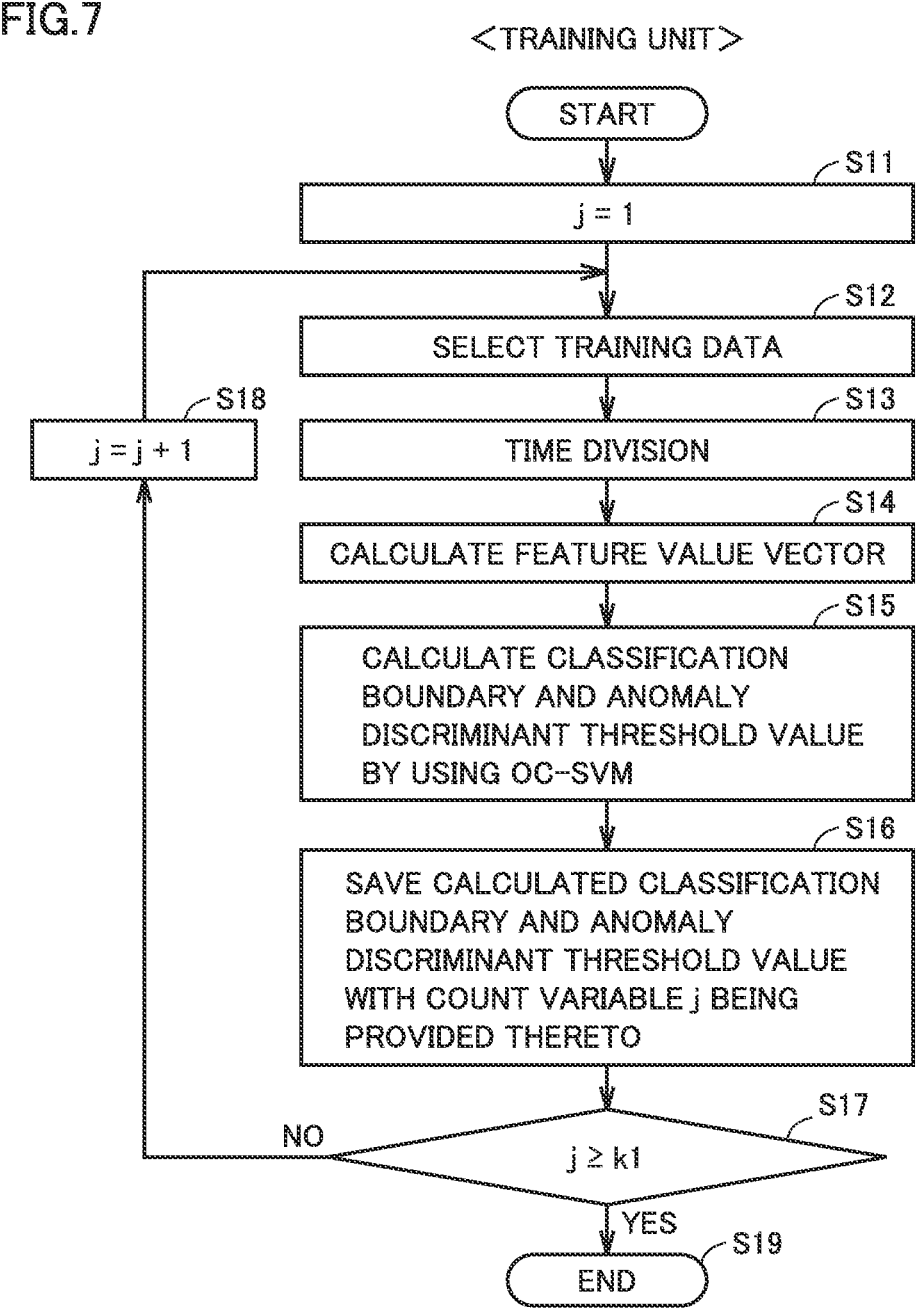
FIG. 7 is a flowchart for illustrating processing performed by a training unit in the first embodiment.

FIG. 7 is a flowchart for illustrating processing performed by the training unit in FIG. 2. Initially, in step S11, training unit 142 initializes a count variable j to 1. Then, in step S12, the training unit randomly selects D1 pieces of training data from among a plurality of pieces of measurement data obtained while the tested apparatus is normal. In succession, as described with reference to FIG. 3, the training unit divides each piece of training data into segments (step S13) and calculates a feature value vector for each segment (step S14).

In succession, in step S15, training unit 142 calculates a classification boundary and an anomaly discriminant threshold value with OC-SVM, by using D1×m feature value vectors included in the selected training data. When a classification boundary and a discriminant threshold value are calculated for the jth time in step S16, the classification boundary and the discriminant threshold value are saved with a count variable being provided thereto.

In order to repeat processing in S12 to S16 the number of times of repetition K1, while count variable j is smaller than the number of times of repetition K1 in step S17 (NO in S16), count variable j is incremented in step S18. In step S12, combination of already selected measurement data is not used. When count variable j attains to the number of times of repetition K1 in step S17, calculation of K1 classification boundaries and discriminant threshold values ends and the process ends in step S19.

Figure 8:
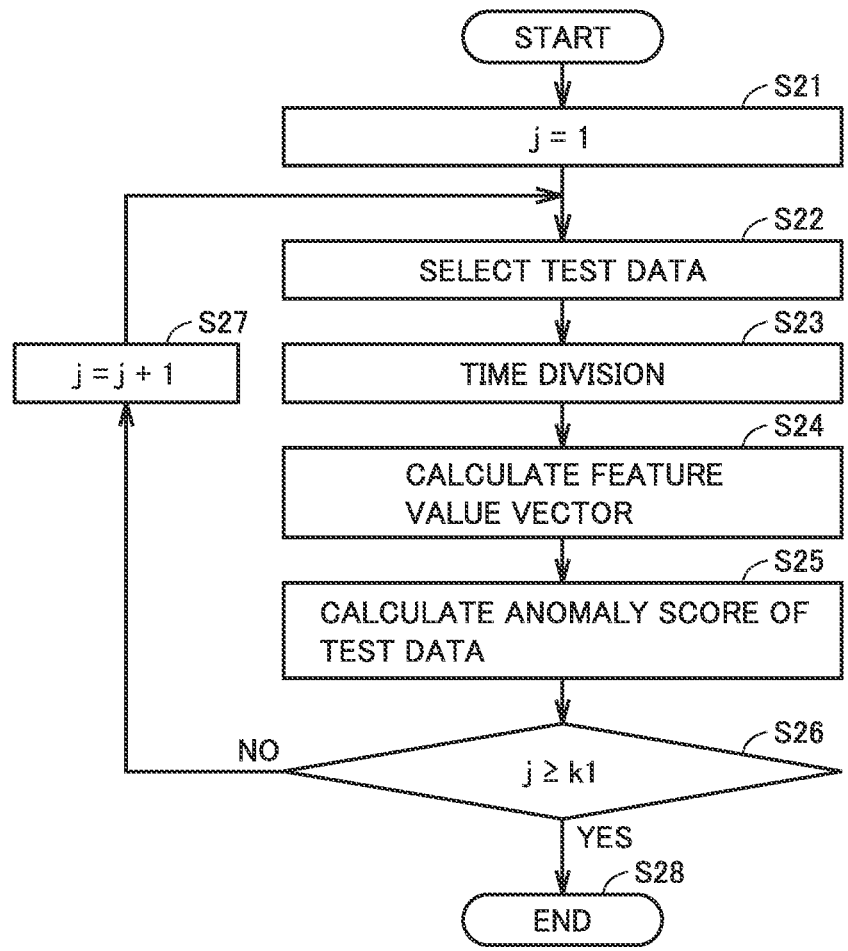
FIG. 8 is a flowchart for illustrating processing performed by an anomaly score calculator in the first embodiment.

FIG. 8 is a flowchart for illustrating processing performed by the anomaly score calculator in FIG. 2. Initially, in step S21, anomaly score calculator 146 initializes count variable j to 1. Then, in step S22, the anomaly score calculator randomly selects D2 pieces of test data from among a plurality of pieces of measurement data obtained at the time of diagnosis. In succession, as described with reference to FIG. 3, each piece of test data is divided into segments (step S23) and a feature value vector is calculated for each segment (step S24).

In succession, in step S25, anomaly score calculator 146 calculates an anomaly score of each segment of the test data by using the classification boundary of the jth selected training data generated by training unit 142 and held in threshold value storage 144.

In order to repeat processing in S22 to S25 the number of times of repetition K1, while count variable j is smaller than the number of times of repetition K1 in step S26 (NO in S16), count variable j is incremented in step S27. In step S22, combination of measurement data already selected as test data is not used.

When an anomaly score of each segment is calculated the number of times of repetition K1 in step S26, the process ends in step S28.

FIG. 9 is a flowchart for illustrating processing performed by the discriminant unit in FIG. 2. Initially, in step S31, discriminant unit 148 initializes both of count variables i and j to 1. Then, jth selected test data (test data j) is adopted as a target of discrimination (step S32), and an anomaly score of the ith segment (a segment i) of the test data is compared with the anomaly discriminant threshold value of the jth selected training data to make anomaly determination (step S33). In order to repeat processing in S32 to S35 for a total number of segments D2×m, while count variable i is smaller than the total number of segments D2×m in step S34 (NO in S34), count variable i is incremented in step S35.

When an anomaly score of each of segments 1 to D2×m of test data j is calculated in step S34, discriminant unit 148 calculates an anomaly ratio of test data j in step S36.

As described also with reference to FIG. 4, an anomaly ratio is calculated by dividing the number of anomaly scores of anomaly scores 1 to D2×m of segments 1 to D2×m exceeding the anomaly discriminant threshold value by the total number of segments D2×m.

In order to repeat processing in S32 to S36 the number of times of repetition K1, while count variable j is smaller than the number of times of repetition K1 in step S37 (NO in S37), count variable j is incremented in step S38.

When an anomaly ratio of each piece of test data 1 to K1 is calculated in step S37, discriminant unit 148 calculates an average of anomaly ratios in step S39 by averaging anomaly ratios 1 to K1, and quits the process in step S40.

As described above, measurement data which has conventionally been determined as error data and not been used is also usable by calculating a feature value vector by dividing training data and test data into segments. In addition, by repeating random selection from among a plurality of pieces of measurement data, computation, and calculation of an average of anomaly ratios, anomaly ratios converge and a result of discrimination is stabilized.

Example 1

A state monitoring method in the first embodiment described above was subjected to a verification experiment. A bearing was adopted as a tested apparatus, and an example of monitoring of a state of the bearing provided with an artificial damage in a raceway surface is shown.

A vibration acceleration was measured while an angular ball bearing provided with a small cylindrical hole and a rectangular groove by electric discharge machining in an outer raceway thereof was operated at a constant speed with a radial load and an axial load being applied. Five types of diameter of the discharge hole and shape of the groove (a damage size below) were set as shown below. The vibration acceleration was measured eleven times at each damage size. A tested machine was disassembled and reassembled each time of measurement. An operation condition and a measurement condition are as below.

Operation Condition

Bearing: angular ball bearing (model number 7216 having an inner diameter of 80 mm, an outer diameter of 140 mm, and a width of 26 mm)
Radial load: 1.3 kN
Axial load: 1.3 kN
Rotation speed: 1500 revolutions/minute
Damage size: 0.00 mm (normal), φ0.34 mm (cylindrical hole), φ0.68 mm (cylindrical hole), φ1.02 mm (cylindrical hole), φ1.35 mm (cylindrical hole), and a circumferential dimension of 2 mm× an axial dimension of 10 mm× a depth of 1 mm (rectangular groove)

Measurement Condition

Measurement data: vibration acceleration
Measurement direction: vertical direction, horizontal direction, and axial direction
Data length: 20 seconds
Sampling speed: 50 kHz
The number of times of measurement: eleven times/damage size
Usefulness of the Example was evaluated by using vibration acceleration data at each damage size obtained above.

Calculation of Feature Value Vector of Training Data and Test Data

The vibration acceleration data obtained in one measurement of which duration was 20 seconds was subjected to frequency filtering processing (low pass: 20 to 1000 Hz, band pass: 1000 to 5000 Hz, and high pass: 5000 to 20000 Hz) and thereafter divided every 0.2 second (five revolutions of a rotation shaft) into 100 segments. Feature values (an overall value OA, a maximum value Max, a crest factor Crest factor, a kurtosis, and a skewness) in a time domain, a frequency domain, and a quefrency domain of the divided measurement data (segment data) were calculated and subjected to each filtering processing at the same time. Thereafter by handling together the feature values in each domain, a feature value vector was obtained (FIG. 3).

Selection of Training Data

Eight pieces of measurement data were randomly selected as training data from among eleven pieces of measurement data obtained while the tested apparatus was normal. All feature value vectors obtained from the selected measurement data were handled together for use as data for training.

Selection of Test Data

Three of eleven obtained feature value sets were randomly selected for various damage sizes. Three remaining pieces after random selection of eight pieces as training data were employed as data without damage. All feature value vectors obtained from the selected measurement data were employed as data for testing.

Preparation of Classification Boundary and Anomaly Discriminant Threshold Value

A classification boundary was prepared by using OC-SVM from a feature value vector of training data (FIG. 5). Anomaly scores of all feature value vectors of training data were calculated based on the prepared classification boundary, and an anomaly discriminant threshold value was calculated in accordance with the following expression (1).

Anomaly discriminant threshold value=average value of anomaly scores+5×standard deviations of anomaly scores    (1)

Calculation of Anomaly Ratio of Test Data

An anomaly score of each feature value vector of the test data was calculated by using the classification boundary, and an anomaly ratio of the test data was calculated in accordance with the following expression (2) (FIG. 4).

Anomaly ratio=the number of feature value vectors exceeding anomaly discriminant threshold value/the total number of feature value vectors    (2)

Diagnosis

Processing above was repeated ten times and an average of anomaly ratios at each damage size was calculated. When the average of the anomaly ratios was equal to or greater than 0.5, the test data was regarded as being abnormal.

Figure 10A:
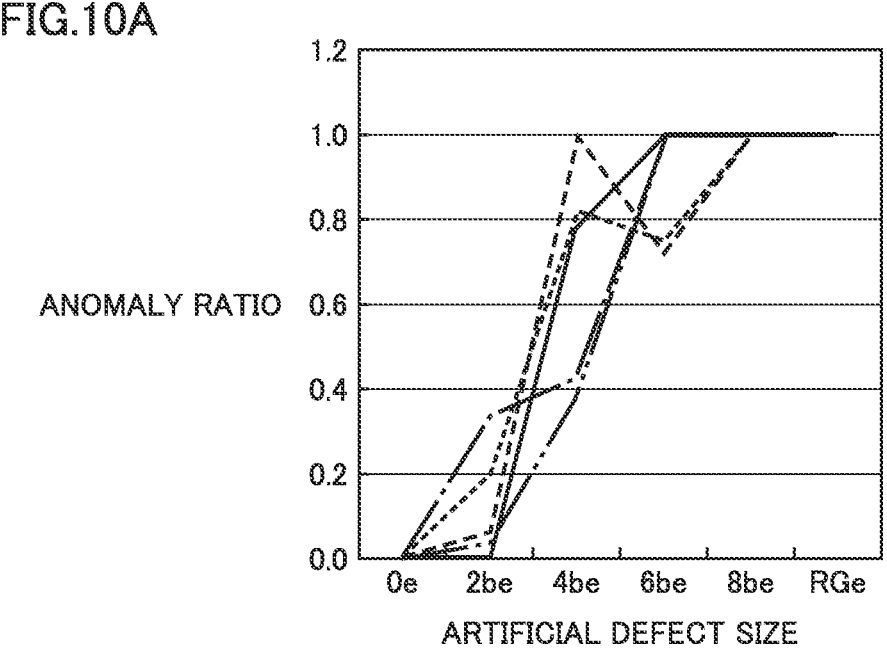
FIG. 10A shows a graph of an effect (an anomaly ratio) of calculation of an average of anomaly ratios.
Figure 10B:
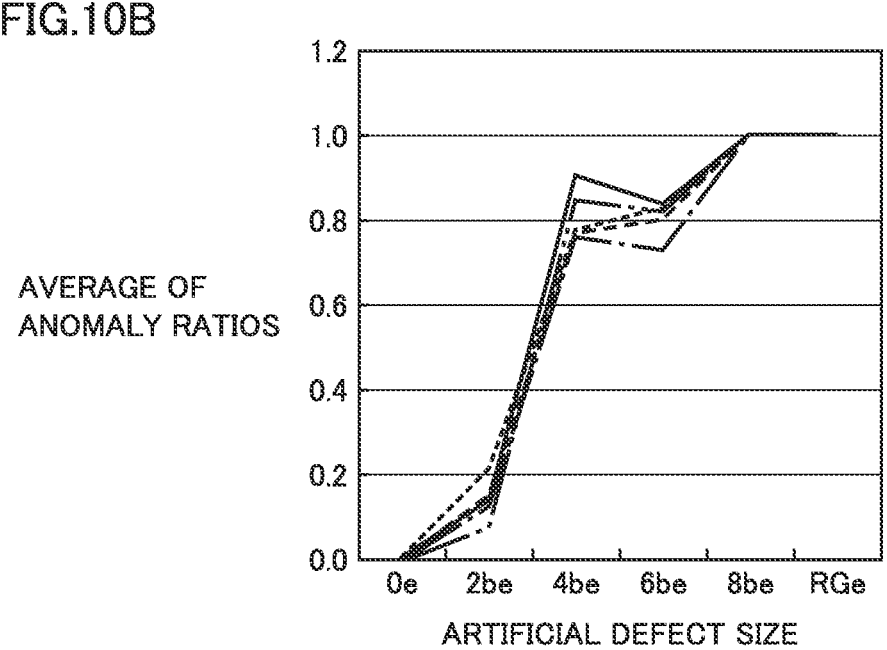
FIG. 10B shows a graph of an effect (an average of anomaly ratios) of calculation of an average of anomaly ratios.

FIGS. 10A and 10B each show a graph of an effect of calculation of an average of anomaly ratios. FIG. 10A shows relation between an anomaly ratio and an artificial defect size in each calculation (ten times). FIG. 10B shows relation between an average of anomaly ratios and an artificial defect size when the average of anomaly ratios was calculated. An artificial defect size 0be represents a tested object without a defect, 2be, 4be, 6be, and 8be represent ϕ0.34 mm (cylindrical hole), ϕ0.68 mm (cylindrical hole), ϕ1.02 mm (cylindrical hole), and ϕ1.35 mm (cylindrical hole), respectively, and RGe represents the rectangular groove having a circumferential dimension of 2 mm× an axial dimension of 10 mm× a depth of 1 mm. It can be seen based on comparison between FIGS. 10A and 10B that calculation of an average of anomaly ratios is less in variation at each defect size, and hence use of the average of anomaly ratios for anomaly discrimination tends to lead to a stable result of discrimination.

Example 2

Example 2 is common to Example 1 in the operation condition and the measurement condition. A set of five temporally successive segments (segment set) each including the feature value vector found in Example 1 was employed as a new feature value vector.

Figures 11, 12:
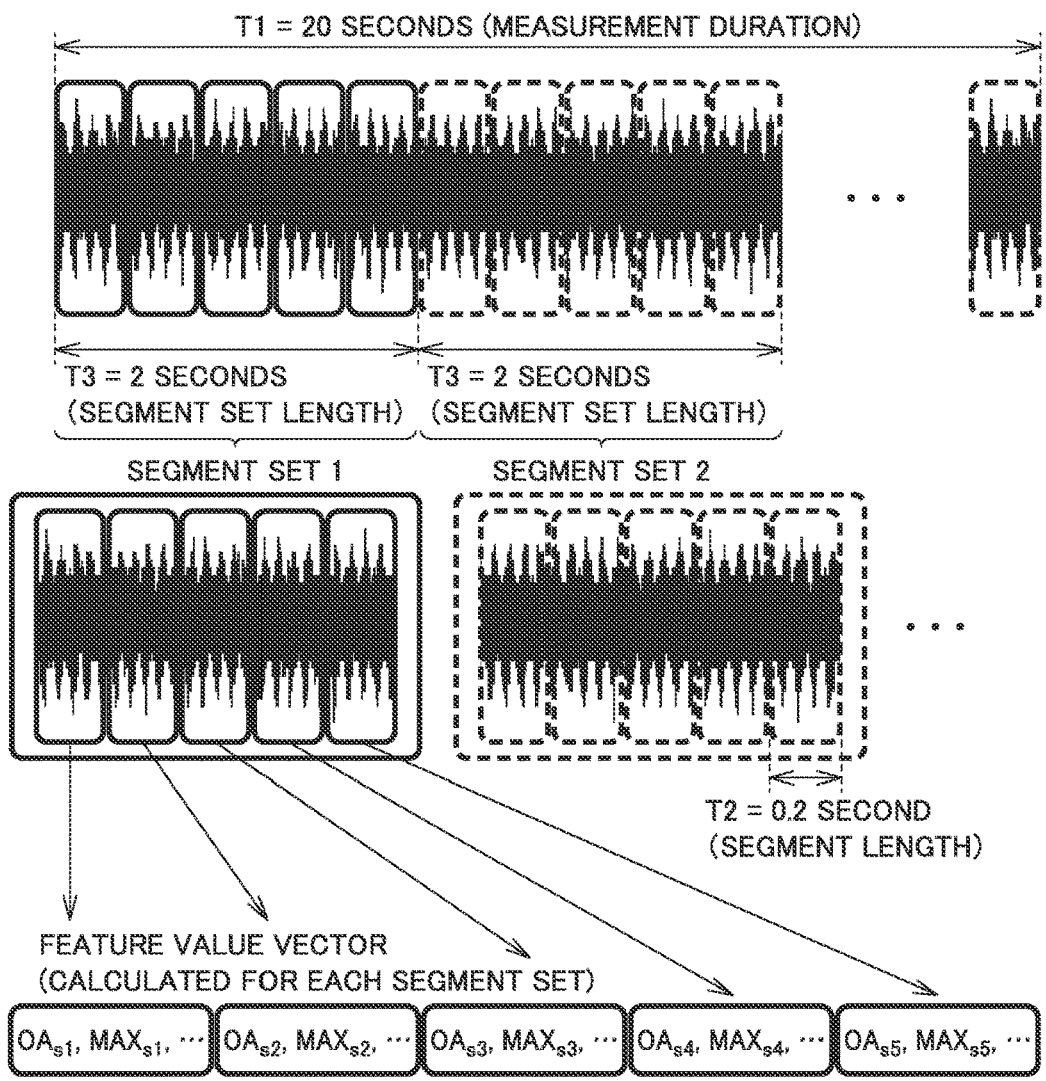
FIG. 11 is a conceptual diagram for illustrating calculation of a feature value vector for each segment set.
FIG. 12 is a diagram showing a result of anomaly discrimination in the first embodiment.

FIG. 11 is a conceptual diagram for illustrating calculation of a feature value vector for each segment set. Time length T1 of measurement data was set to 20 seconds and time length T2 of the segment was set to 0.2 second. A time length T3 of the segment set was set to 2 seconds. In Example 2, five feature value vectors of five successive segments in Example 1 were handled together to be defined as the feature value vector of the segment set.

Processing was performed in a procedure the same as in Example 1 by using the feature value vector of the segment set.

Comparative Example

In a Comparative Example, an overall value generally used for diagnosis was employed as a feature value. A calculation method in Comparative Example is shown below.

Overall values in the vertical direction in the normal state (without damage) and at each damage size were calculated. One overall value was found from the whole measurement data.

Eight pieces of measurement data were randomly selected as training data from among eleven pieces of measurement data obtained while the tested apparatus was normal, and an anomaly discriminant threshold value was calculated based on overall values of the selected measurement data in accordance with the following expression (3).

Anomaly discriminant threshold value=average value of overall values+5×standard deviations of overall values    (3)

Three pieces of measurement data obtained in the normal state (without damage) and at each damage size were selected as test data, and an anomaly ratio was calculated in accordance with the following expression (4) by using overall values of the test data. For the normal state, measurement data different from data from which the anomaly discriminant threshold value was prepared was employed.

Anomaly ratio=the number of overall values exceeding anomaly determination threshold value/the number of pieces of test data    (4)

Processing until calculation of an anomaly ratio was repeated and an average of anomaly ratios at each damage size was calculated. When the average of the anomaly ratios was equal to or greater than 0.5, the test data was regarded as being abnormal.

Evaluation

FIG. 12 is a diagram showing a result of anomaly discrimination in the first embodiment. FIG. 12 shows a result of calculation five times of an average of anomaly ratios with training data and test data being varied in Examples 1 and 2 and Comparative Example. When the averages of anomaly ratios were all equal to or greater than 0.5 in calculation five times, evaluation as "A" was made, when the average was equal to or greater than 0.5 even once, evaluation as "B" was made, and when the average did not exceed 0.5, evaluation as "C" was made. Examples 1 and 2 were higher in accuracy in anomaly discrimination than Comparative Example.

As described above, according to the state monitoring method in the present invention, anomaly of a rotary machine affected by an operating condition or noise can more promptly be discriminated based on measurement data, and accuracy of a state monitoring system can be improved.

Function and Effect

According to the present invention, a small damage in a rotary machine affected by an operating condition or noise which has not conventionally been discriminated can be discriminated.

The state monitoring method according to the present embodiment includes first to ninth steps. In the first step (S1), a plurality of pieces of first measurement data of a first time length are obtained at timings different from one another from a sensor provided in a tested target while the tested target is normal.

In a second step (S1), a plurality of pieces of second measurement data of the first time length are obtained at timings different from one another when the tested target is diagnosed.

In a third step (S12), a plurality of pieces of training data are randomly selected from the plurality of pieces of first measurement data. In a fourth step (S22), a plurality of pieces of test data are randomly selected from the plurality of pieces of second measurement data. In a fifth step (S13 and S14), each of the plurality of pieces of training data is divided into pieces of segment data of second time length T2 shorter than first time length T1 and a first feature value vector including a plurality of feature values is prepared for each divided piece of segment data. In a sixth step (S15), a classification boundary between normal and abnormal and an anomaly discriminant threshold value are prepared from a plurality of first feature value vectors prepared for each piece of segment data for the plurality of pieces of training data. In a seventh step (S23 and S24), each of the plurality of pieces of test data is divided into pieces of segment data of the second time length and a second feature value vector including a plurality of feature values is prepared for each divided piece of segment data. In an eighth step (S25 and S36), an anomaly score representing a distance from the classification boundary is calculated for the second feature value vector and an anomaly ratio representing a ratio of the number of anomaly scores of the second feature value vectors exceeding the anomaly discriminant threshold value to a total number of the second feature value vectors is calculated for each of the plurality of pieces of test data. In a ninth step (S37 to S39), the third to eighth steps are repeated a plurality of times and the tested target is discriminated as being abnormal when an average value of obtained anomaly ratios exceeds a prescribed value.

In the fifth step (S13 and S14) and the seventh step (S23 and S24), for example, data measured during a period of certain time length T1 is divided every time length T2 such as a rotation period or a cycle to calculate a feature value vector, and thereafter feature value vectors are handled as a feature value set. Thus, temporal change in feature value can be evaluated.

Time length T2 is desirably an integer multiple of a rotation period or an operation cycle.

Examples of the feature value in the fifth step (S13 and S14) and the seventh step (S23 and S24) include raw measurement data or an overall value, a maximum value, a crest factor, a kurtosis, and a skewness in a time domain, a frequency domain, and a quefrency domain which are subjected to band pass filtering.

In the third step (S12), a feature value vector is randomly selected from a signal output over a long period including preparation, stop, and resumption, so that a normal model in consideration of variation in characteristic of a machine can be prepared.

In the fourth step (S22), as in the third step (S12), a feature value vector is randomly selected from data obtained over a long period including preparation, stop, and resumption, so that test data in consideration of variation in characteristic of a machine can be prepared.

Other than SVM, examples of approaches to be used for learning of a normal model and preparation of an anomaly discriminant indicator and an anomaly discriminant threshold value include random forest, logistic regression, decision tree, and a neural network.

In the ninth step (S37 to S39), erroneous evaluation about a machine of which operating condition is varied can be prevented by changing a normal model and test data, calculating an anomaly ratio a plurality of times, and averaging the anomaly ratios.

An output signal from a sensor to be used for monitoring of a state should only be an output signal on which checking of an operating condition of a rotary machine and facilities can be based, and examples thereof include signals indicating vibration, sound, a temperature, load torque, and motor power.

Second Embodiment

A second embodiment is common to the first embodiment in basic configuration of the state monitoring apparatus shown in FIGS. 1 and 2.

In the second embodiment, however, training unit 142 generates a classification boundary between normal and anomaly based on data (normal data) obtained from storage device 130 while tested apparatus 10 is normal (an initial state or the like), an anomaly discriminant threshold value for discriminating an anomaly score corresponding to a distance from the classification boundary, and information on a feature value to be used, the information representing a type of a feature value used for calculation of an anomaly score (a feature value to be used), and has threshold value storage 144 store them.

Anomaly score calculator 146 calculates a feature value to be used that is represented by the information on the feature value to be used, from data (test data) obtained from storage device 130 at the time of diagnosis of tested apparatus 10, and applies the classification boundary to a feature value vector containing the calculated feature value to be used as a component (a reconstructed feature value vector which will be described later). Anomaly score calculator 146 calculates an anomaly score corresponding to a distance form the classification boundary and sends the anomaly score to discriminant unit 148.

Discriminant unit 148 discriminates anomaly of tested apparatus 10 based on a result of comparison between the anomaly score and the anomaly discriminant threshold value.

Preparation of Feature Value Vector

One of characteristics of state monitoring apparatus 100 in the present embodiment is that, in processing measurement data, it divides the whole measurement data into a plurality of segments and performs processing for each segment, rather than collectively processing the whole measurement data. Furthermore, another characteristic of the second embodiment is also discrimination as to normal/abnormal by using a feature value less in variation as a feature value to be used, from among a plurality of feature values calculated from measurement data. A reconstructed feature value vector containing a feature value to be used as a component that is prepared for each segment will be described below.

Figure 13:
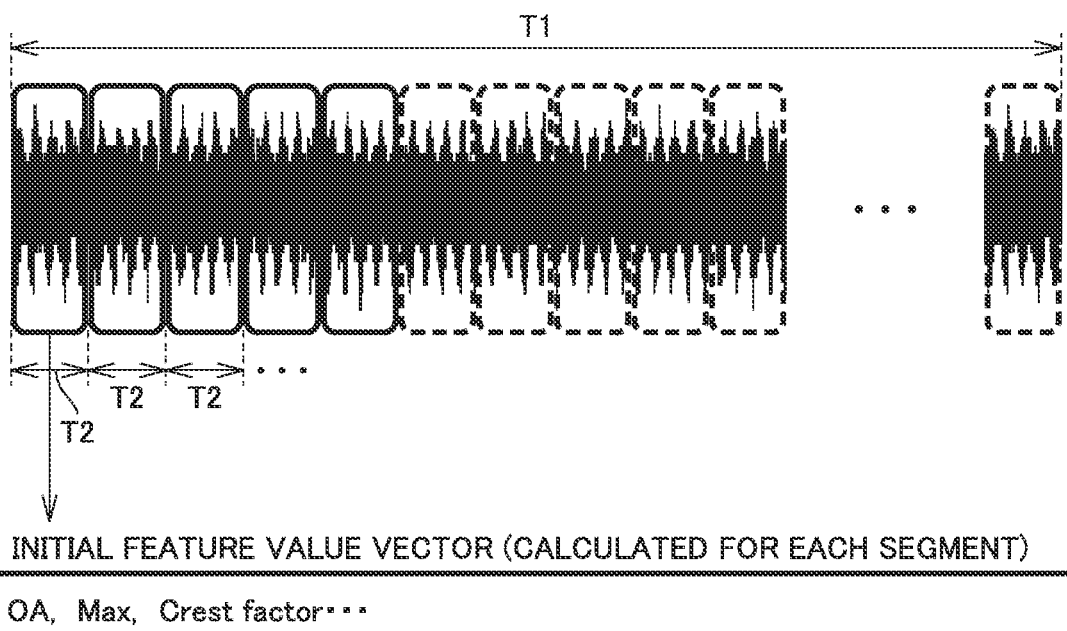
FIG. 13 is a conceptual diagram showing relation between measurement data and segment data in a second embodiment.

FIG. 13 is a conceptual diagram showing relation between measurement data and segment data. Referring to FIG. 13, measurement data refers to data of time length T1 which is obtained by A/D conversion by A/D converter 110 of a signal output from vibration sensor 20 and filtering processing by data obtaining unit 120 and stored in storage device 130.

The measurement data stored in storage device 130 includes training data and test data. The training data refers to measurement data obtained when tested apparatus 10 has been known to be normal (for example, an initial state or the like). The test data refers to measurement data obtained when discrimination as to normal/abnormal of tested apparatus 10 is desired. The training data determines a classification boundary or an anomaly discriminant threshold value which will be described later. As a result of prescribed processing onto test data by using the classification boundary and the anomaly discriminant threshold value, whether tested apparatus 10 is normal or abnormal is discriminated.

When the measurement data of time length T1 is processed by training unit 142 and anomaly score calculator 146, it is divided into segments each having time length T2 shorter than time length T1 as shown in FIG. 3. For example, when time length T1 is set to 20 seconds, time length T2 can be set to 0.2 second. In this case, one piece of measurement data is divided into 100 pieces of segment data. After the measurement data is divided, training unit 142 and anomaly score calculator 146 further calculate a plurality of features values of a predetermined type for each segment and prepare an initial feature value vector containing each of the plurality of feature values as a component.

For example, when vibration is defined as measurement data, an overall value (OA), a maximum value (Max), a crest factor (Crest factor), a kurtosis, a skewness, and a value thereof subjected to signal processing (FFT processing, quefrency processing) can be defined as a feature value. The initial feature value vector means handling of a plurality of feature values as one set of vectors. For one piece of measurement data, initial feature value vectors as many as the number of pieces of segment data resulting from division of the measurement data are prepared.

Training unit 142 calculates an indicator value representing variation of each component in a plurality of initial feature value vectors (as many as the number of pieces of segment data resulting from division of training data) prepared from each of a plurality of randomly selected pieces of training data. For example, a coefficient of variance (a value calculated by dividing a standard deviation by an arithmetic mean) or variance can be employed as an indicator value. Training unit 142 determines a component (a feature value) of which indicator value is equal to or smaller than a predetermined sampling threshold value as a component to be used (a feature value to be used), and has threshold value storage 144 store information on the feature value to be used which represents a type of a feature value adopted as the component to be used.

Training unit 142 and anomaly score calculator 146 sample a component to be used that is represented by the information on the feature value to be used from the initial feature value vector for each of the initial feature value vectors generated from the measurement data, and prepare a feature value vector consisting of sampled components to be used (which is referred to as a reconstructed feature value vector below).

Training unit 142 and anomaly score calculator 146 generate a reconstructed feature value vector for each initial feature value vector. For one piece of measurement data, initial feature value vectors as many as the number of pieces of segment data resulting from division of the measurement data are prepared and reconstructed feature value vectors as many as the initial feature value vectors are prepared.

Figure 14:
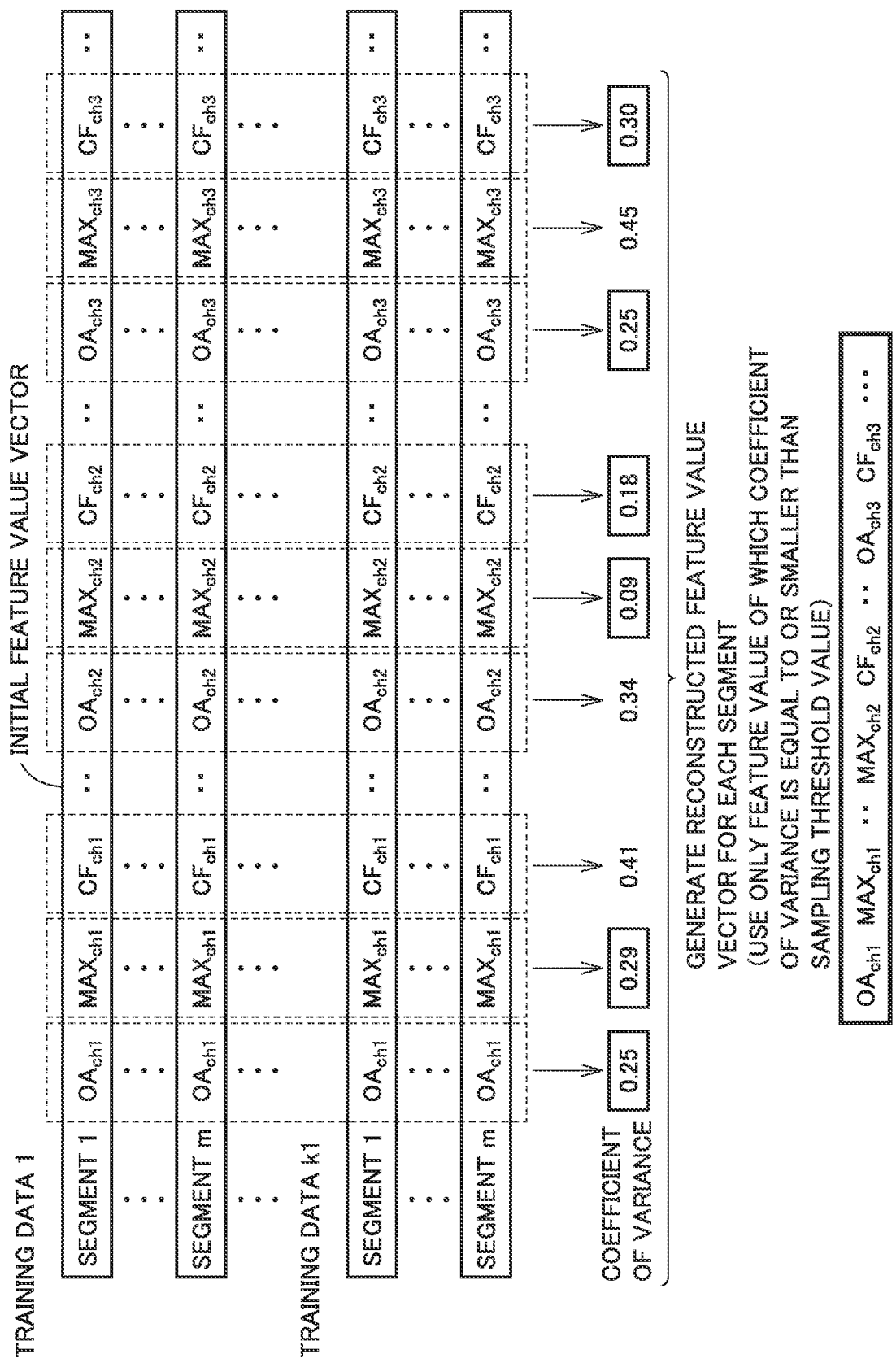
FIG. 14 is a diagram for illustrating relation between an initial feature value vector and a reconstructed feature value vector in the second embodiment.

FIG. 14 is a diagram for illustrating one example of a procedure for preparing a reconstructed feature value vector from an initial feature value vector. FIG. 14 shows an example in which m initial feature value vectors are generated for each of K1 pieces of training data. Each initial feature value vector includes as components (feature values), an overall value "$OA_{ch1}$", a maximum value "$Max_{ch1}$", and a crest factor "$CF_{ch1}$" in a frequency band ch1, an overall value "$OA_{ch2}$", a maximum value "$Max_{ch2}$", and a crest factor "$CF_{ch2}$" in a frequency band ch2, and an overall value "$OA_{ch3}$", a maximum value "$Max_{ch3}$", and a crest factor "$CF_{ch3}$" in a frequency band ch3.

Training unit 142 calculates an indicator value (a coefficient of variance in FIG. 14) representing variation for each component of the initial feature value vector, and determines components "$OA_{ch1}$", "$Max_{ch1}$", "$Max_{ch2}$", "$CF_{ch2}$", "$OA_{ch3}$", and "$CF_{ch3}$" of which indicator values are equal to or smaller than a sampling threshold value (0.3 in FIG. 14) as components to be used. Therefore, training unit 142 and anomaly score calculator 146 generate a vector consisting of the components to be used "$OA_{ch1}$", "$Max_{ch1}$", "$Max_{ch2}$", "$CF_{ch2}$", "$OA_{ch3}$", and "$CF_{ch3}$", . . . as a reconstructed feature value vector. When measurement data is divided into m segments, m reconstructed feature value vectors are prepared for one piece of measurement data.

Figure 15:
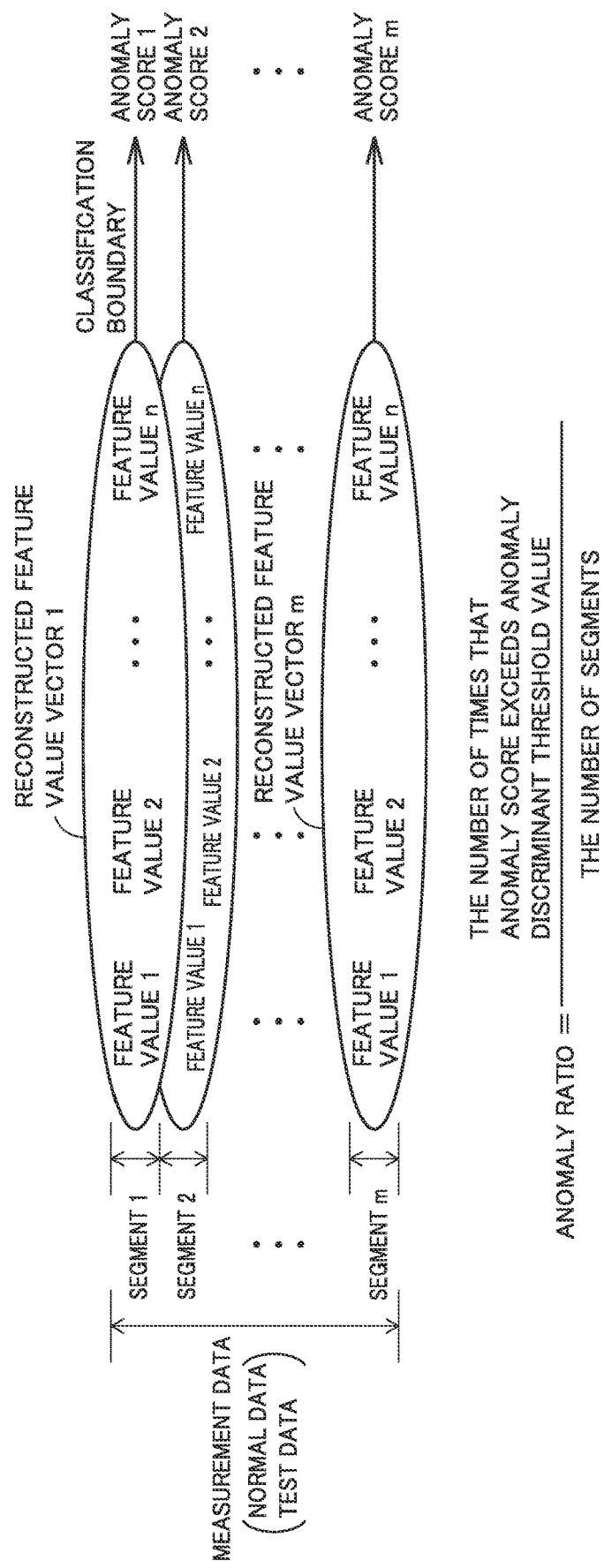
FIG. 15 is a diagram for illustrating a reconstructed feature value vector in the second embodiment.

FIG. 15 is a diagram for illustrating a reconstructed feature value vector. FIG. 15 shows an example in which measurement data is divided into m segments and there are n components to be used (feature values to be used) of which indicator value representing variation is equal to or smaller than a sampling threshold value. As shown in FIG. 15, a reconstructed feature value vector consisting of n components to be used is prepared for each segment, and whether tested apparatus 10 is normal or abnormal is discriminated by using m reconstructed feature value vectors.

When whole measurement data is collectively used for processing for sampling of a feature value and preparation of a feature value vector, in case of occurrence of sudden anomaly, the whole measurement data may become unusable for diagnosis. Therefore, in the present embodiment, measurement data is divided into segments and a feature value is sampled and a feature value vector is calculated for each segment. For example, when a rotary machine is monitored by a vibration sensor, temporary impact such as drop of a tool while measurement data is being acquired may be detected by the vibration sensor as sudden vibration. Even in such a case, by sampling a feature value for each segment, a correct feature value can be sampled during a period other than sudden anomaly, and by comparing a feature value for each segment, evaluation can be made with a segment corresponding to sudden anomaly being excluded.

The initial feature value vector includes all of a plurality of predetermined feature values as components. Therefore, the components of the initial feature value vector include a component (a feature value) likely to be affected by an operating condition of tested apparatus 10 and a component (a feature value) less likely to be affected thereby. For example, there are a feature value which includes sudden noise and is likely to be varied even though the operating condition is normal and a feature value less likely to be affected by noise. When whether tested apparatus 10 is normal or abnormal is discriminated by using a feature value including sudden noise, erroneous discrimination that the tested apparatus is abnormal although it is normal may be made due to mere sudden noise or erroneous discrimination that the tested apparatus is normal although it is abnormal may be made because a signal resulting from an abnormal condition is buried in noise. Therefore, in the present embodiment, whether tested apparatus 10 is normal or abnormal is discriminated by using a reconstructed feature value vector consisting of components (feature values) of which indicator value (for example, a coefficient of variance) representing variation is equal to or smaller than a sampling threshold value. An error rate can thus be lowered.

Method of Computing Anomaly Score

As shown in FIG. 15, anomaly scores 1 to m are computed for reconstructed feature value vectors 1 to m, respectively, based on the classification boundary. The classification boundary is an indicator for making anomaly discrimination that is used in an already known anomaly detection approach (one class support vector machine: OC-SVM). Since the basic concept of OC-SVM has already been described with reference to FIG. 5, description will not be repeated.

Processing in Data Obtaining Unit

Figure 16:
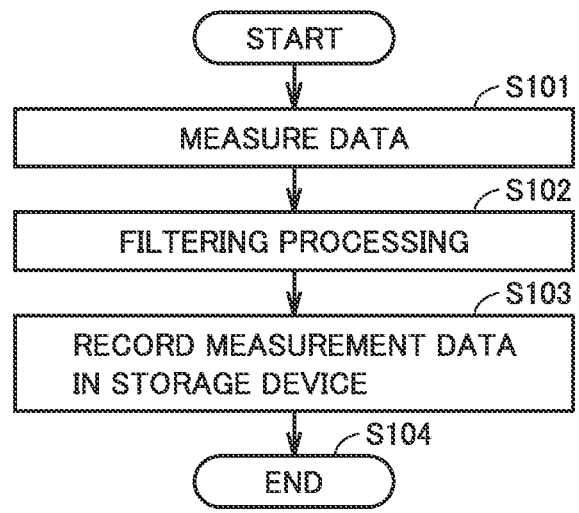
FIG. 16 is a flowchart for illustrating processing performed by the data obtaining unit in the second embodiment.

FIG. 16 is a flowchart for illustrating processing performed by the data obtaining unit in FIG. 1 in the second embodiment. Data obtaining unit 120 receives data resulting from digital conversion of a signal including a vibration waveform from vibration sensor 20 in step S101, subjects an abnormal phenomenon to be observed to appropriate filtering processing among low pass filtering, band pass filtering, and high pass filtering to achieve a basic noise-removed state in step S102, and has the data stored in storage device 130 in step S103.

Data obtaining unit 120 obtains training data when tested apparatus 10 has been known to normally operate, for example, when the tested apparatus is in an initial state or repair thereof has been completed, and it automatically obtains test data at time designated by a timer or the like when diagnosis is desired while tested apparatus 10 is being used.

Processing in Training Unit

Figure 17:
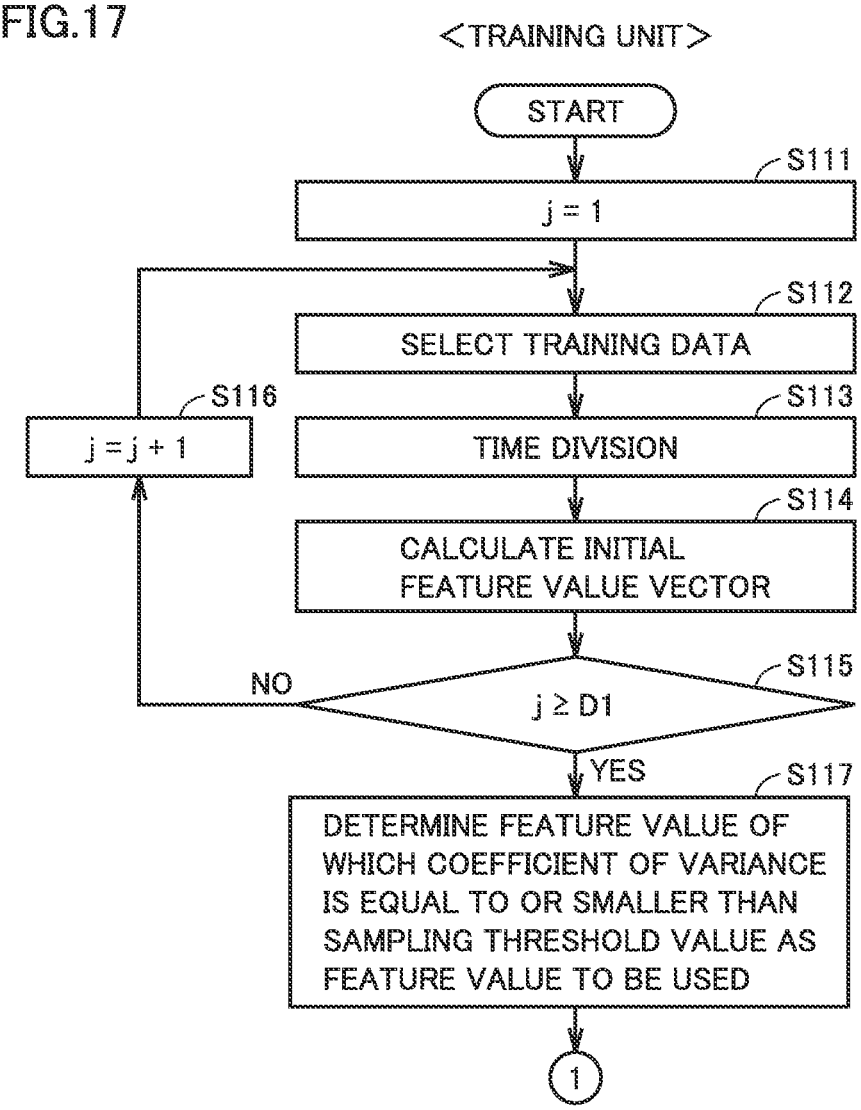
FIG. 17 is a flowchart for illustrating a former stage of processing performed by the training unit in the second embodiment.
Figure 18:
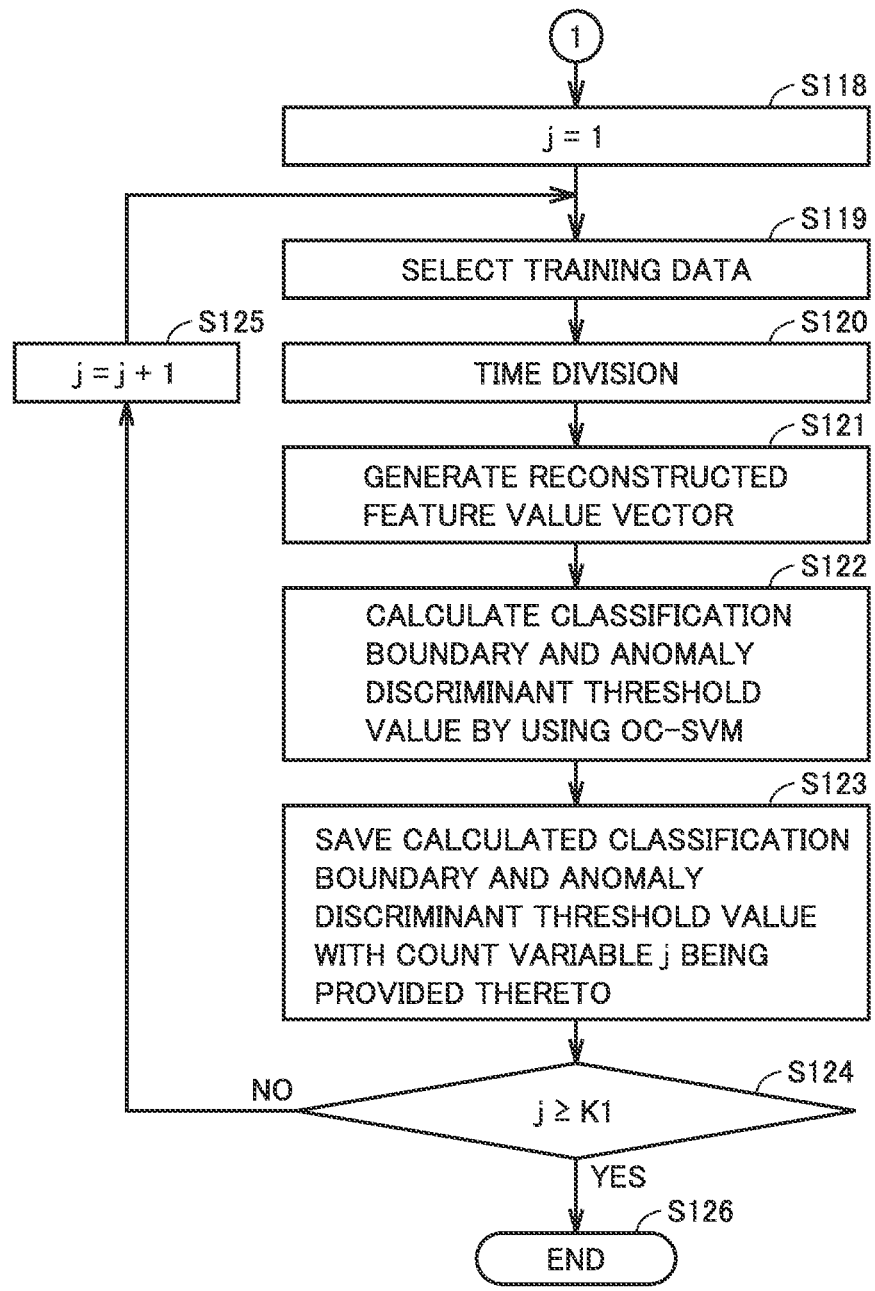
FIG. 18 is a flowchart for illustrating a latter stage of the processing performed by the training unit in the second embodiment.

FIG. 17 is a flowchart for illustrating a former stage of processing performed by the training unit in FIG. 2 in the second embodiment. FIG. 18 is a flowchart for illustrating a latter stage of the processing performed by the training unit in FIG. 2 in the second embodiment. Initially, in step S111, training unit 142 initializes count variable j to 1. Then, in step S112, the training unit randomly selects one piece of training data from among a plurality of pieces of measurement data obtained while the tested apparatus is normal. In succession, as described with reference to FIG. 13, the training unit divides the training data into segments (step S113) and prepares an initial feature value vector for each segment (step S114). In order to repeat processing in S112 to S114 for the selected number D1 of pieces of training data, while count variable j is smaller than the selected number D1 in step S115 (NO in S115), count variable j is incremented in step S116. In step S112, normal data other than normal data already selected as training data is selected.

When processing in S112 to S114 is repeated for the selected number D1 of pieces of training data, initial feature value vectors as many as the number calculated by multiplying the selected number D1 of pieces of training data by a divisor m for division into segments are prepared. In step S117, training unit 142 calculates an indicator value representing variation for each component (feature value) of the initial feature value vectors, with D1×m initial feature value vectors being defined as a population. It is assumed that a coefficient of variance is calculated as the indicator value. Training unit 142 determines a component of which coefficient of variance is equal to or smaller than a predetermined sampling threshold value as a component to be used (feature value to be used), and has threshold value storage 144 store the information on the feature value to be used which represents a type of the determined component to be used. A feature value to be used for discrimination as to normal/abnormal of tested apparatus 10 (feature value to be used) is thus determined.

In succession in step S118 (see FIG. 18), count variable j is initialized to 1. Then, in step S119, D1 pieces of training data are randomly selected from a plurality of pieces of measurement data obtained while the tested apparatus is normal. In succession, as described with reference to FIG. 13, each piece of training data is divided into segments (step S120), and a reconstructed feature value vector consisting of a component to be used that is determined in step S117 is calculated for each segment (step S121).

In succession, in step S122, training unit 142 calculates a classification boundary and an anomaly discriminant threshold value by using OC-SVM, for D1×m reconstructed feature value vectors. When the classification boundary and the discriminant threshold value are calculated for the jth time in step S123, they are saved with count variable j being provided thereto.

In order to repeat processing in S119 to S123 the number of times of repetition K1, while count variable j is smaller than the number of times of repetition K1 in step S124 (NO in S124), count variable j is incremented in step S125. In step S119, combination of already selected measurement data is not used. When count variable j attains to the number of times of repetition K1 in step S124, calculation of K1 classification boundaries and K1 discriminant threshold values ends and the process ends in step S126.

Processing in Anomaly Score Calculator

Figure 19:
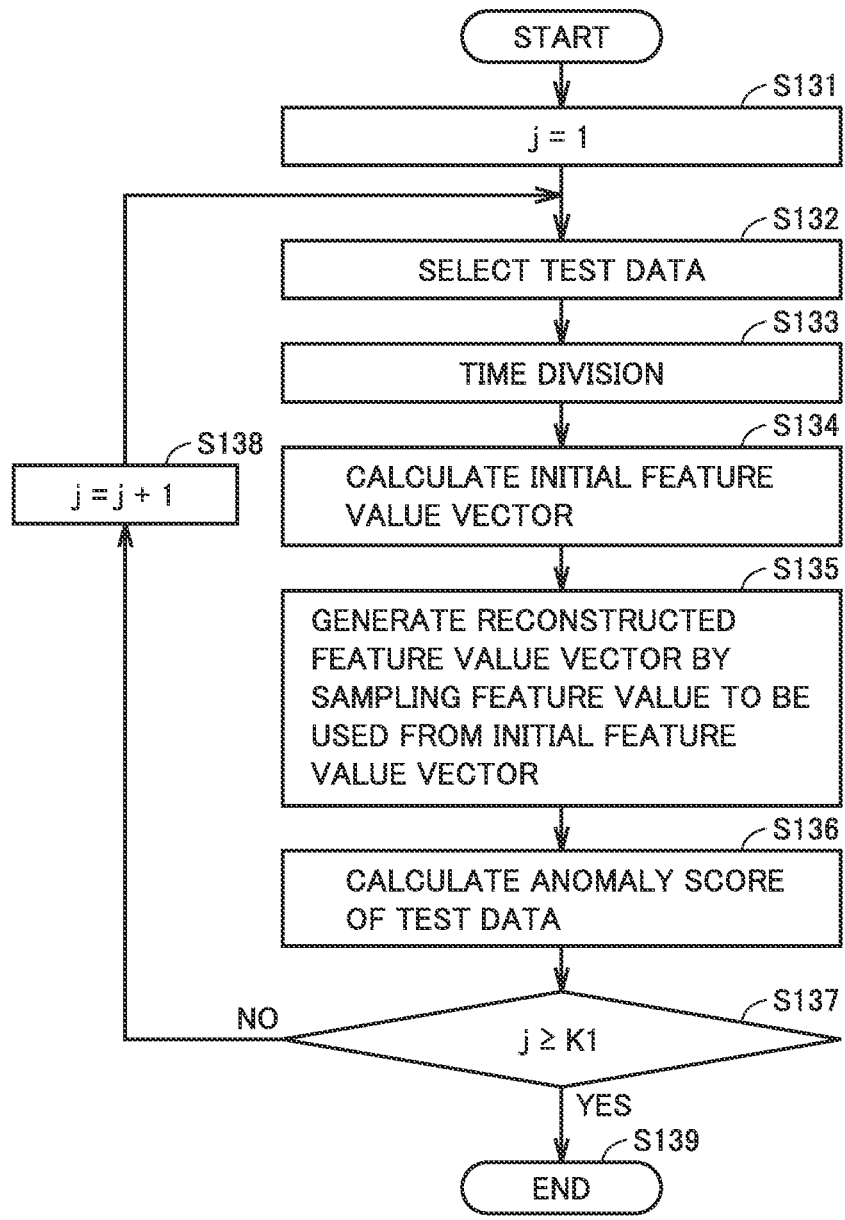
FIG. 19 is a flowchart for illustrating processing performed by the anomaly score calculator in the second embodiment.

FIG. 19 is a flowchart for illustrating processing performed by the anomaly score calculator in FIG. 2 in the second embodiment. Initially, in step S131, anomaly score calculator 146 initializes count variable j to 1. Then, in step S132, the anomaly score calculator randomly selects D2 pieces of test data from a plurality of pieces of measurement data obtained at the time of diagnosis. In succession, as described with reference to FIG. 13, each piece of test data is divided into segments (step S133), and an initial feature value vector including a plurality of feature values of a predetermined type is calculated for each segment (step S134). Anomaly score calculator 146 prepares a reconstructed feature value vector by sampling from the initial feature value vector, a component to be used (feature value to be used) represented by information on the feature value to be used that is stored in threshold value storage 144 (step S135). The reconstructed feature value vector consists of a component to be used represented by the information on the feature value to be used.

In succession, in step S136, anomaly score calculator 146 calculates for the reconstructed feature value vector prepared in step S135, an anomaly score by using the classification boundary of jth-selected training data generated by training unit 142 and held in threshold value storage 144. Since the reconstructed feature value vector is prepared for each segment, the anomaly score is also calculated for each segment.

In order to repeat processing in S132 to S136 the number of times of repetition K1, while count variable j is smaller than the number of times of repetition K1 in step S137 (NO in S137), count variable j is incremented in step S138. In step S132, combination of measurement data already selected as test data is not used.

When an anomaly score of each segment is calculated the number of times of repetition K1 in step S137, the process ends in step S139.

Processing in Discriminant Unit

Figure 20:
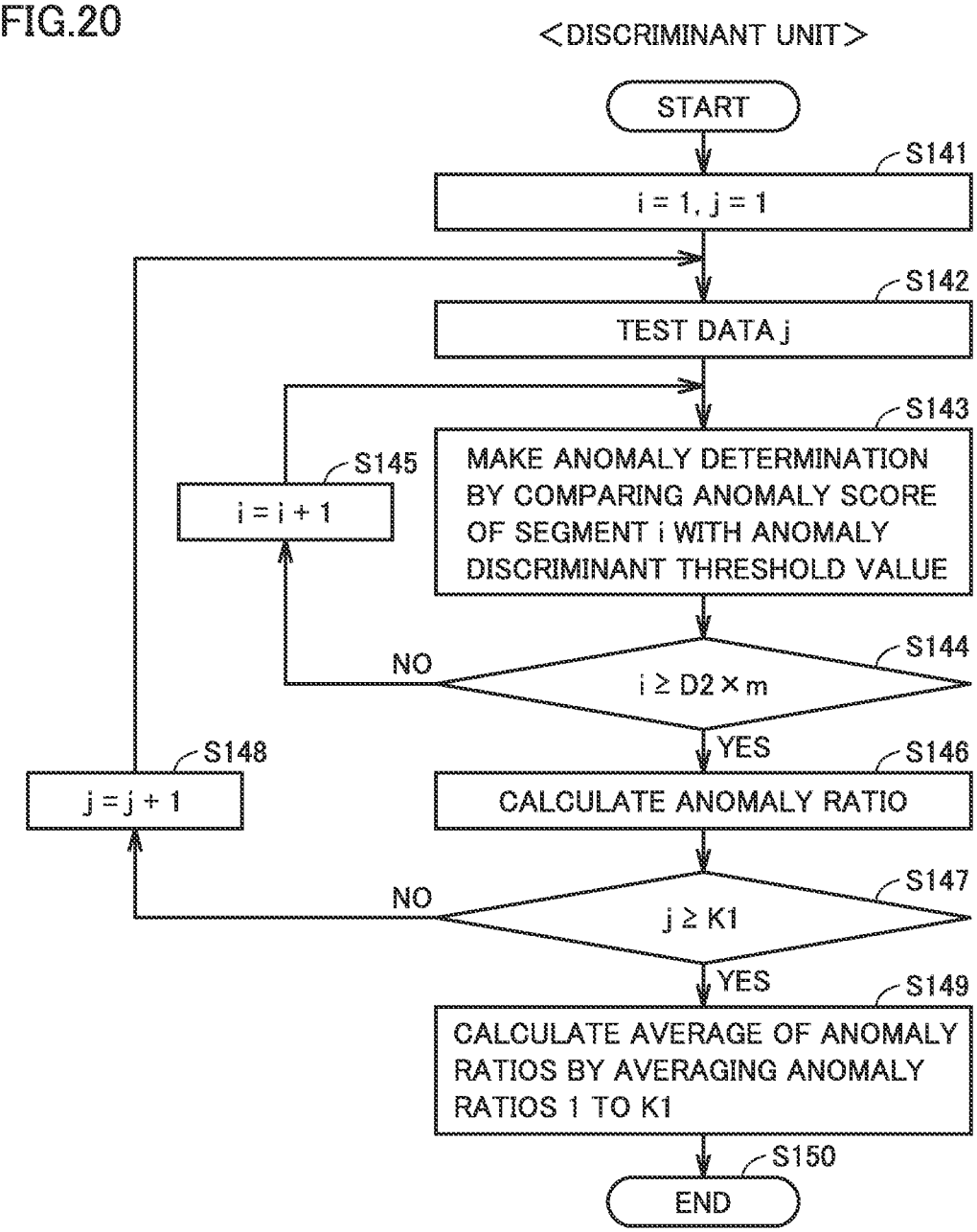
FIG. 20 is a flowchart for illustrating processing performed by the discriminant unit in the second embodiment.

FIG. 20 is a flowchart for illustrating processing performed by the discriminant unit in FIG. 2 in the second embodiment. Initially, in step S141, discriminant unit 148 initializes both of count variables i and j to 1. Then, D2 pieces of jth-selected test data (test data j) are adopted (step S142), and an anomaly score of the ith segment (segment i) of the D2 pieces of test data is compared with the anomaly discriminant threshold value of the jth-selected training data to make anomaly discrimination (step S143). In order to repeat processing in S142 to S145 for a total number of segments D2×m, while count variable i is smaller than the total number of segments D2×m in step S134 (NO in S144), count variable i is incremented in step S145.

When an anomaly score of each of segments 1 to D2×m of test data j is calculated in step S144, discriminant unit 148 calculates an anomaly ratio of test data j in step S146.

As described also with reference to FIG. 15, an anomaly ratio is calculated by dividing the number of anomaly scores exceeding the anomaly discriminant threshold value of anomaly scores 1 to D2×m of segments 1 to D2×m by the total number of segments D2×m.

In order to repeat processing in S142 to S146 the number of times of repetition K1, while count variable j is smaller than the number of times of repetition K1 in step S147 (NO in S147), count variable j is incremented in step S148.

When an anomaly ratio of each piece of test data 1 to K1 is calculated in step S147, discriminant unit 148 calculates an average of anomaly ratios in step S149 by averaging anomaly ratios 1 to K1 and quits the process in step S150.

As described above, also in the second embodiment, measurement data which has conventionally been determined as error data and not been used is also usable by finding an initial feature value vector by dividing training data and test data into segments. Furthermore, erroneous determination as to normal/abnormal due to influence by noise can be lessened by preparing a reconstructed feature value vector by adopting a component less in variation as a component to be used and sampling the component to be used from an initial feature value vector. In addition, by repeating random selection from among a plurality of pieces of measurement data, computation, and calculation of an average of anomaly ratios, anomaly ratios converge and a result of discrimination is stabilized.

Example 1

A state monitoring method in the second embodiment described above was subjected to a verification experiment. A bearing was adopted as a tested apparatus, and an example of monitoring of a state of the bearing provided with an artificial damage in a raceway surface is shown.

A vibration acceleration was measured while an angular ball bearing provided with a small cylindrical hole and a rectangular groove by electric discharge machining in an outer raceway thereof was operated at a constant speed with a radial load and an axial load being applied. Five types of diameter of the discharge hole and shape of the groove (a damage size below) were set as shown below. The vibration acceleration was measured eleven times at each damage size. A tested machine was disassembled and reassembled each time of measurement. An operation condition and a measurement condition were the same as in the first embodiment as below, and an initial feature value vector was obtained under those conditions in the second embodiment.

Operation Condition

Bearing: angular ball bearing (model number 7216 having an inner diameter of 80 mm, an outer diameter of 140 mm, and a width of 26 mm)
Radial load: 1.3 kN
Axial load: 1.3 kN
Rotation speed: 1500 revolutions/minute
Damage size: 0.00 mm (normal), $\phi$0.34 mm (cylindrical hole), $\phi$0.68 mm (cylindrical hole), $\phi$1.02 mm (cylindrical hole), $\phi$1.35 mm (cylindrical hole), and a circumferential dimension of 2 mm× an axial dimension of 10 mm× a depth of 1 mm (rectangular groove)

Measurement Condition

Measurement data: vibration acceleration
Measurement direction: vertical direction, horizontal direction, and axial direction
Data length: 20 seconds
Sampling speed: 50 kHz
The number of times of measurement: eleven times/damage size
Usefulness of the Example was evaluated by using vibration acceleration data at each damage size obtained above.

Calculation of Initial Feature Value Vector of Training Data and Test Data

The vibration acceleration data obtained in one measurement of which duration was 20 seconds was subjected to frequency filtering processing (low pass: 20 to 1000 Hz, band pass: 1000 to 5000 Hz, and high pass: 5000 to 20000 Hz) and thereafter divided every 0.2 second (five revolutions of a rotation shaft) into 100 segments. Feature values (an overall value OA, a maximum value Max, a crest factor Crest factor, a kurtosis, and a skewness) in a time domain, a frequency domain, and a quefrency domain of the divided measurement data (segment data) were calculated and subjected to each filtering processing at the same time. Thereafter by handling together feature values in each domain, an initial feature value vector was obtained (FIG. 13).

Selection of Training Data

Eight pieces of measurement data were randomly selected as training data from among eleven pieces of measurement data obtained while the tested apparatus was normal. All initial feature value vectors obtained from the selected measurement data were handled together for use as data for training.

Selection of Test Data

Three of eleven obtained pieces of measurement data were randomly selected for various damage sizes. Three remaining pieces after random selection of eight pieces as training data were employed as data without damage. All initial feature value vectors obtained from the selected measurement data were employed as data for testing.

Preparation of Reconstructed Feature Value Data

A coefficient of variance representing variation was calculated for each component of an initial feature value vector for all initial feature value vectors included in data for training, and a component of which coefficient of variance was equal to or smaller than 0.3 was determined as a component to be used. A reconstructed feature value vector was prepared by sampling only components to be used determined from each of all initial feature value vectors included in data for training and data for testing.

Preparation of Classification Boundary and Anomaly Discriminant Threshold Value A classification boundary was prepared by using OC-SVM from the reconstructed feature value vector of training data (FIG. 5). Anomaly scores of all reconstructed feature value vectors of training data were calculated based on the prepared classification boundary, and an anomaly discriminant threshold value was calculated in accordance with the following expression (11).

Anomaly discriminant threshold value=average value of anomaly scores+5×standard deviations of anomaly scores (11)

Calculation of Anomaly Ratio of Test Data

An anomaly score of each reconstructed feature value vector of the test data was calculated by using the classification boundary, and an anomaly ratio of the test data was calculated in accordance with the following expression (12) (FIG. 15).

Anomaly ratio=the number of feature value vectors exceeding anomaly discriminant threshold value/the total number of feature value vectors (12)

Diagnosis

Processing above was repeated ten times and an average of anomaly ratios at each damage size was calculated. When the average of the anomaly ratios was equal to or greater than 0.5, the test data was regarded as being abnormal.

Figure 21A:
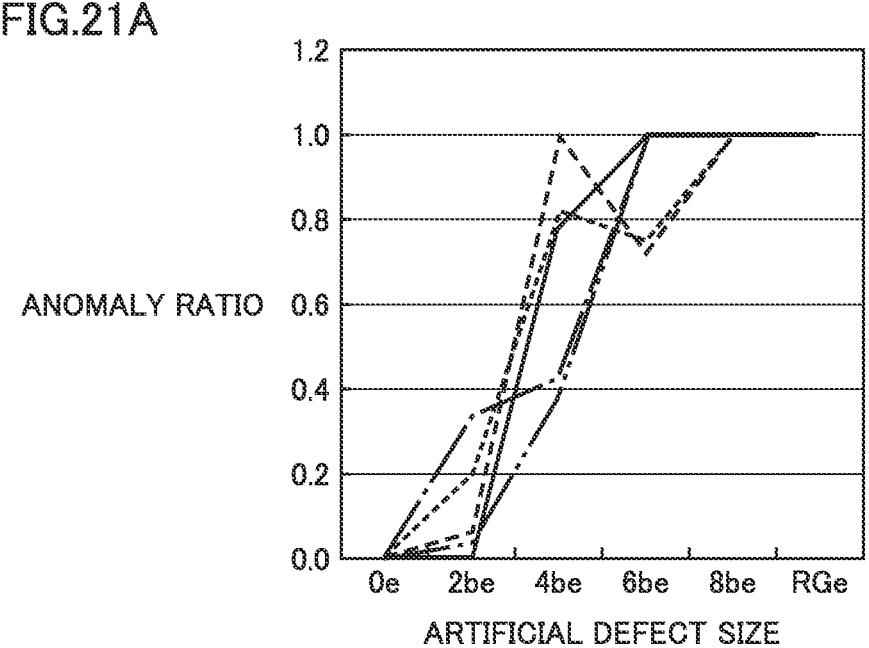
FIG. 21A shows a graph of an effect (an anomaly ratio) of calculation of an average of anomaly ratios.
Figure 21B:
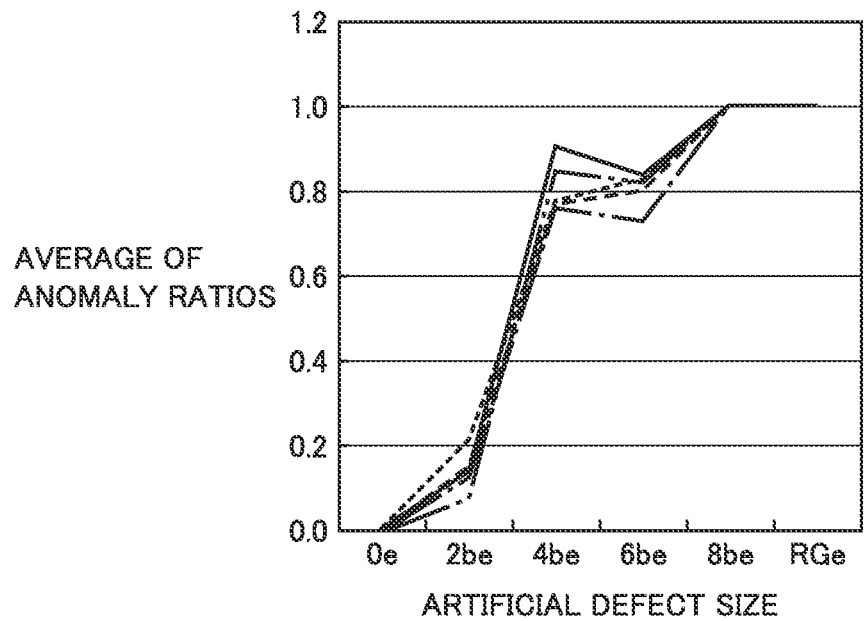
FIG. 21B shows a graph of an effect (an average of anomaly ratios) of calculation of an average of anomaly ratios.

FIGS. 21A and 21B each show a graph of an effect of calculation of an average of anomaly ratios. FIG. 21A shows relation between an anomaly ratio and an artificial defect size in each calculation (ten times). FIG. 21B shows relation between an average of anomaly ratios and an artificial defect size when the average of anomaly ratios was calculated. An artificial defect size 0be represents a tested object without a defect, 2be, 4be, 6be, and 8be represent ϕ0.34 mm (cylindrical hole), ϕ0.68 mm (cylindrical hole), ϕ1.02 mm (cylindrical hole), and ϕ1.35 mm (cylindrical hole), respectively, and RGe represents the rectangular groove having a circumferential dimension of 2 mm× an axial dimension of 10 mm× a depth of 1 mm. It can be seen based on comparison between FIGS. 21A and 21B that calculation of an average of anomaly ratios is less in variation at each defect size, and hence use of the average of anomaly ratios for anomaly discrimination tends to lead to a stable result of discrimination.

Example 2

Example 2 is common to Example 1 in the operation condition and the measurement condition. A set of five temporally successive segments (segment set) each including the initial feature value vector found in Example 1 was employed as a new initial feature value vector.

Figures 22, 23:
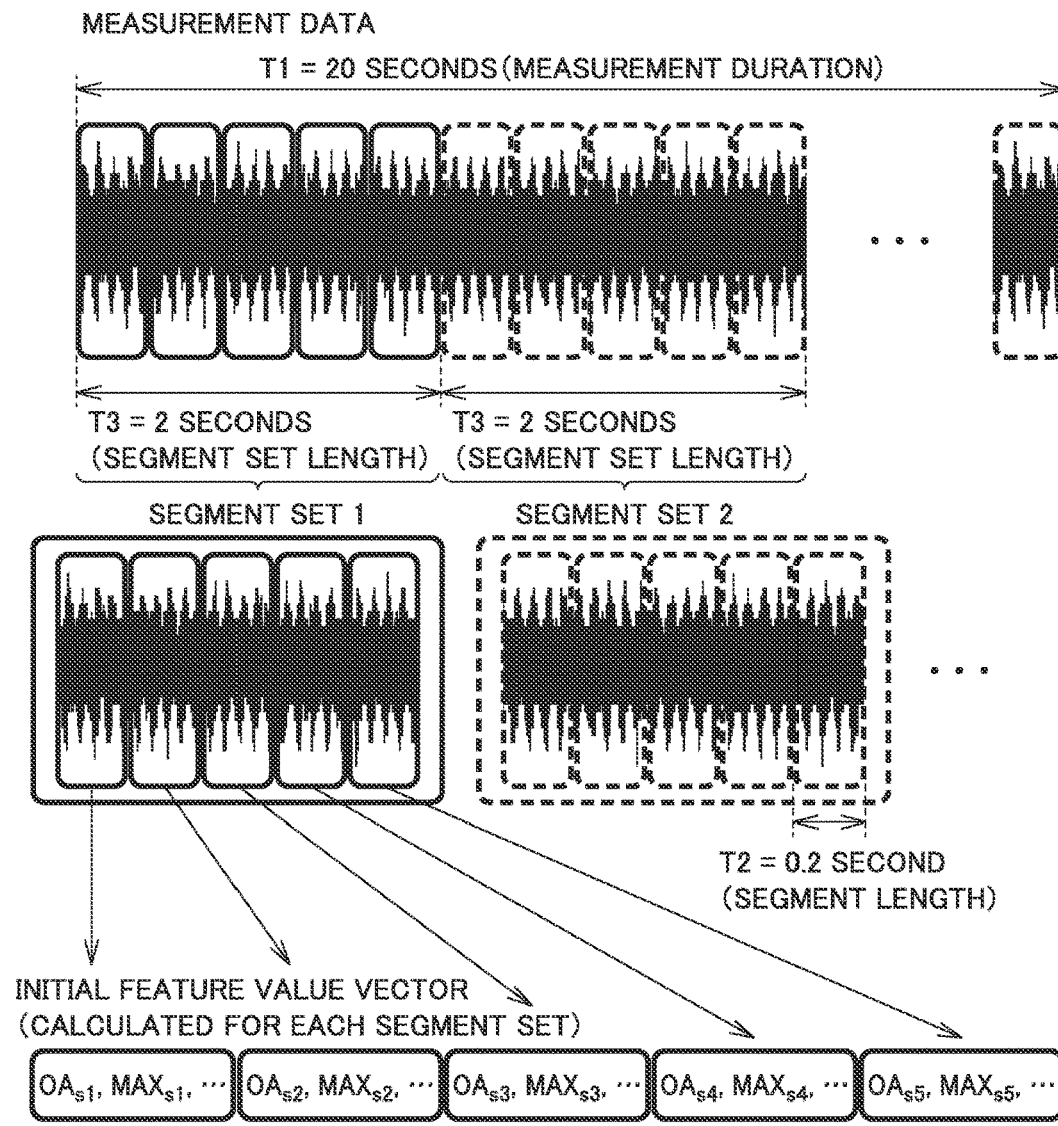
FIG. 22 is a conceptual diagram for illustrating calculation of a feature value vector for each segment set.
FIG. 23 is a diagram showing results of averages of anomaly ratios in Examples 1 and 2 and Comparative Example 1.

FIG. 22 is a conceptual diagram for illustrating calculation of an initial feature value vector for each segment set. Time length T1 of measurement data was set to 20 seconds and time length T2 of the segment was set to 0.2 second. Time length T3 of the segment set was set to 2 seconds. In Example 2, five initial feature value vectors of five successive segments in Example 1 were handled together to be defined as the initial feature value vector of the segment set.

A coefficient of variance representing variation was calculated for each component of the initial feature value vectors of the segment set, a reconstructed feature value vector consisting of a component to be used, of which calculated coefficient of variance was equal to or smaller than 0.3, was prepared, and processing was performed in a procedure the same as in Example 1.

Comparative Example 1

In Comparative Example 1, an overall value generally used for diagnosis was employed as a feature value. A calculation method in the comparative example is shown below.

Overall values in the vertical direction in the normal state (without damage) and at each damage size were calculated. One overall value was found from the whole measurement data.

Eight pieces of measurement data were randomly selected as training data from among eleven pieces of measurement data obtained while the tested apparatus was normal, and an anomaly discriminant threshold value was calculated from overall values of the selected measurement data in accordance with the following expression (13).

Anomaly discriminant threshold value=average value of overall values+5×standard deviations of overall values (13)

Three pieces of measurement data obtained in the normal state (without damage) and at each damage size were selected as test data, and an anomaly ratio was calculated in accordance with the following expression (14) by using overall values of the test data. For the normal state, measurement data different from data from which the anomaly discriminant threshold value was prepared was employed.

Anomaly ratio=the number of overall values exceeding anomaly determination threshold value/the number of pieces of test data (14)

Processing until calculation of an anomaly ratio was repeated and an average of anomaly ratios at each damage size was calculated. When the average of the anomaly ratios was equal to or greater than 0.5, the test data was regarded as being abnormal.

Comparative Example 2

Comparative Example 2 is common to Example 1 except that an initial feature value vector was adopted as it was as a reconstructed feature value vector. In other words, Comparative Example 2 is an example in which processing for sampling a component to be used based on a coefficient of variance was not performed.

Example 3

Example 3 is common to Example 2 except that a reconstructed feature value vector was prepared by employing a component of which coefficient of variance was equal to or smaller than 0.05 as a component to be used and a rotation speed representing the operation condition of a tested machine was set to 2000 revolutions/minute.

Example 4

Example 4 is common to Example 2 except for a rotation speed of 2000 revolutions/minute representing the operation condition of the tested machine.

Example 5

Example 5 is common to Example 2 except that a reconstructed feature value vector was prepared by employing a component of which coefficient of variance was equal to or smaller than 0.5 as a component to be used and a rotation speed representing the operation condition of the tested machine was set to 2000 revolutions/minute.

Comparative Example 3

Comparative Example 3 is common to Example 2 except that an initial feature value vector was adopted as it was as a reconstructed feature value vector and a rotation speed representing the operation condition of the tested machine was set to 2000 revolutions/minute. In other words, Comparative Example 3 is an example in which processing for sampling a component to be used based on a coefficient of variance was not performed.

Evaluation

FIG. 23 shows results of averages of anomaly ratios calculated in Examples 1 and 2 and Comparative Examples 1 and 2 in the second embodiment. Referring to FIG. 23, in Comparative Example 1, though there was a cylindrical hole as a defect having a diameter of 1.35 mm, an average of the anomaly ratios was lower than 0.1 and accuracy in anomaly discrimination was very low. In Comparative Example 2, even though there was a cylindrical hole as a defect having a diameter of 1.35 mm, an average of the anomaly ratios was lower than 0.5, and Comparative Example 2 was low in accuracy in anomaly discrimination although it was higher in accuracy than Comparative Example 1. In contrast, it can be seen that, in Example 1, an average of anomaly ratios in an example of a cylindrical hole as a defect having a diameter of 1.35 mm exceeded 0.5, and accuracy in anomaly discrimination was improved as compared with Comparative Example 2. In Example 2, an average of anomaly ratios in an example of a cylindrical hole as a defect having a diameter not smaller than 0.68 mm was equal to or higher than 0.8, and accuracy in anomaly discrimination further improved.

In Example 2, a set of five temporally successive segments (segment set) each including the initial feature value vector found in Example 1 was employed as a new initial feature value vector. Therefore, a component of the initial feature value vector in Example 2 included a plurality of feature values different in measurement timing, although a type thereof was the same.

When a certain feature value includes sudden noise, in Example 1, a coefficient of variance of the feature value becomes greater owing to noise. Therefore, the feature value is not used as a component of a reconstructed feature value vector and not used for calculation of an anomaly score. In Example 2, however, for a feature value, only a component corresponding to timing of generation of sudden noise is excluded from a reconstructed feature value vector, and a component corresponding to timing at which sudden noise is not generated is included in a reconstructed feature value vector. In other words, a feature value at timing other than the timing corresponding to noise is used as a component of a reconstructed feature value vector. Thus, in Example 1, a whole feature value including sudden noise is not used as a component of a reconstructed feature value vector, whereas in Example 2, only some of feature values corresponding to timing of generation of noise are excluded and others corresponding to other timings are included in a reconstructed feature value vector. Consequently, as shown in FIG. 14, more types of feature values are used for discrimination as to normal/abnormal and discrimination as to normal/abnormal can more accurately be made in Example 2.

FIGS. 24A to 24D each show results of calculation of an average of anomaly ratios five times, with training data and test data being varied in Examples 3 to 5 and Comparative Example 3. An artificial defect size 0be represents a tested object without a defect, 2be, 4be, 6be, and 8be represent ϕ0.34 mm (cylindrical hole), ϕ0.68 mm (cylindrical hole), ϕ1.02 mm (cylindrical hole), and ϕ1.35 mm (cylindrical hole), respectively, and RGe represents the rectangular groove having a circumferential dimension of 2 mm× an axial dimension of 10 mm× a depth of 1 mm.

Figure 24A:
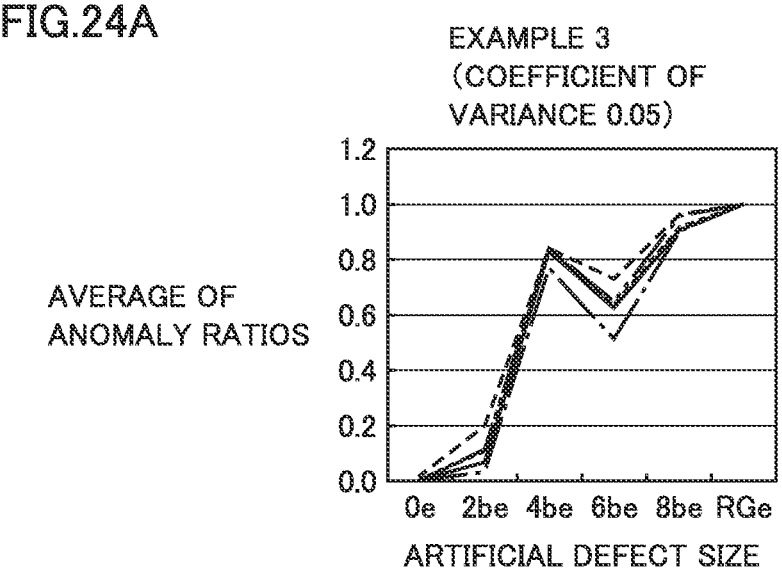
FIG. 24A shows a graph of a result of anomaly discrimination in Example 3.
Figure 24B:
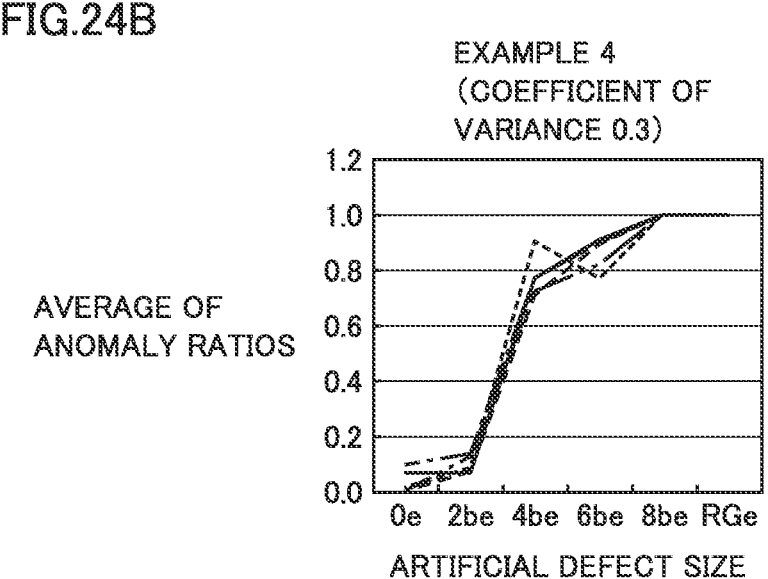
FIG. 24B shows a graph of a result of anomaly discrimination in Example 4.
Figure 24C:
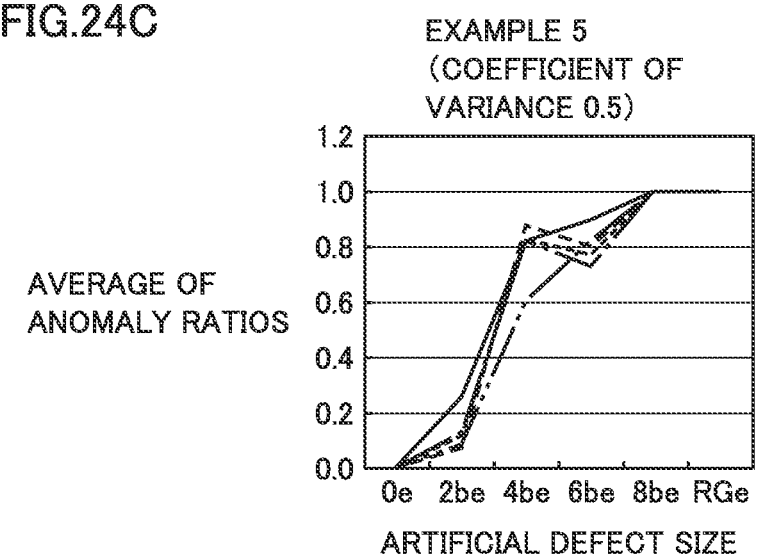
FIG. 24C shows a graph of a result of anomaly discrimination in Example 5.
Figure 24D:
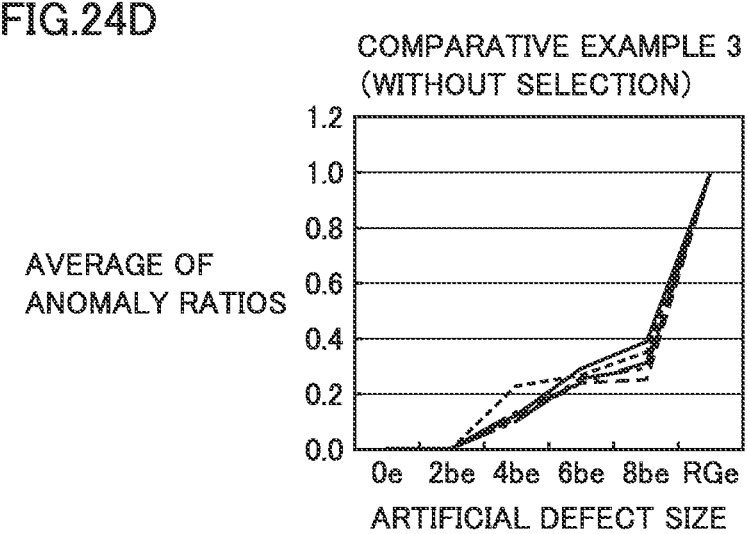
FIG. 24D shows a graph of a result of anomaly discrimination in Comparative Example 2.

As shown in FIG. 24D, it has been found in Comparative Example 3 in which a feature value was not selected based on a coefficient of variance that anomaly discrimination as to a damage other than artificial defect size RGe cannot be made. This may be because of lowering in accuracy in anomaly discrimination due to greater variation caused by change in bearing than variation caused by the artificial defect size in at least one feature value.

In contrast, as shown in FIGS. 24A to 24C, it was confirmed that accuracy in anomaly discrimination improved for a defect of which artificial defect size was greater than 4be in Examples 3 to 5 in which a feature value was selected based on a coefficient of variance. In Example 3 in which a component (feature value) of which coefficient of variance was equal to or smaller than 0.05, an average of anomaly ratios tended to lower in examples of artificial defect sizes of 6be and 8be. This may be because even an effective feature value was excluded. Though Example 5 in which a component of which coefficient of variance was equal to or smaller than 0.5 was employed produced substantially the same result as Example 4 in which a component of which coefficient of variance was equal to or smaller than 0.3 was employed, Example 5 was slightly lower than Example 4 in average of anomaly ratios in the example of the artificial defect size 4be. Therefore, in Examples 3 to 5, 0.3 was most preferred as a sampling threshold value. A sampling threshold value for selecting a component to be used (feature value to be used) should only be set as appropriate.

As described above, according to the state monitoring method in the present invention, anomaly of a rotary machine affected by an operating condition or noise can more promptly be discriminated based on measurement data, and accuracy of a state monitoring system can be improved.

Function and Effect

According to the present invention, a small damage in a rotary machine affected by an operating condition or noise which has not conventionally been discriminated can be discriminated.

The state monitoring method according to the present embodiment includes first to eleventh steps. In the first step (S101), a plurality of pieces of first measurement data of a first time length are obtained at timings different from one another from a sensor provided in a tested target while the tested target is normal.

In a second step (S101), a plurality of pieces of second measurement data of the first time length are obtained at timings different from one another when the tested target is diagnosed.

In a third step (S112 and S119), a plurality of pieces of training data are randomly selected from the plurality of pieces of first measurement data. In a fourth step (S132), a plurality of pieces of test data are randomly selected from the plurality of pieces of second measurement data. In a fifth step (S113 and S114), each of the plurality of pieces of training data is divided into pieces of segment data of second time length T2 shorter than first time length T1 and an initial feature value vector (a first feature value vector) containing each of a plurality of calculated feature values as a component is prepared for each divided piece of segment data. In a sixth step (S117 and S121), a reconstructed feature value vector (a second feature value vector) is prepared for each piece of segment data by calculating an indicator value representing variation for each component of the initial feature value vector, determining a component of which indicator value is smaller than a sampling threshold value as a component to be used, and sampling the component to be used from the initial feature value vector. In a seventh step (S122), a classification boundary between normal and anomaly and an anomaly discriminant threshold value are prepared from a plurality of reconstructed feature value vectors prepared for each piece of segment data for the plurality of pieces of training data.

In an eighth step (S133 and S134), each of a plurality of pieces of test data is divided into pieces of segment data of the second time length, and an initial feature value vector (a third feature value vector) including a plurality of calculated feature values is prepared for each divided piece of segment data. In a ninth step (S135), a reconstructed feature value vector (a fourth feature value vector) is prepared for each piece of segment data by sampling a component to be used from the initial feature value vector (third feature value vector). In a tenth step (S136 and S146), an anomaly score representing a distance from the classification boundary is calculated for the reconstructed feature value vector prepared in the ninth step, and an anomaly ratio representing a ratio of the number of anomaly scores of the reconstructed feature value vectors exceeding the anomaly discriminant threshold value to a total number of the reconstructed feature value vectors is calculated for each of the plurality of pieces of test data. In the eleventh step (S147 to S149), the third to eighth steps are repeated a plurality of times and the tested target is discriminated as being abnormal when an average value of obtained anomaly ratios exceeds a prescribed value.

In the fifth step (S113 and S114) and the eighth step (S133 and S134), for example, data measured during a period of certain time length T1 is divided every time length T2 such as a rotation period or a cycle and an initial feature value vector is calculated. By checking variation in initial feature value vector, temporal change in feature value can be evaluated.

Time length T2 is desirably an integer multiple of a rotation period or an operation cycle.

Examples of the feature value in the fifth step (S113 and S114) and the eighth step (S133 and S134) include raw measurement data or an overall value, a maximum value, a crest factor, a kurtosis, and a skewness in a time domain, a frequency domain, and a quefrency domain which are subjected to band pass filtering.

In the third step (S112 and S119), an initial feature value vector is randomly selected from a signal output over a long period including preparation, stop, and resumption, so that a normal model in consideration of variation in characteristic of a machine can be prepared.

In the fourth step (S132), as in the third step (S112 and S119), an initial feature value vector is randomly selected from data obtained over a long period including preparation, stop, and resumption, so that test data in consideration of variation in characteristic of a machine can be prepared.

Other than SVM, examples of approaches to be used for learning of a normal model and preparation of an anomaly discriminant indicator and an anomaly discriminant threshold value include random forest, logistic regression, decision tree, and a neural network.

In the eleventh step (S147 to S149), erroneous discrimination about a machine of which operating condition is varied can be prevented by changing a normal model and test data, calculating an anomaly ratio a plurality of times, and averaging the anomaly ratios.

An output signal from a sensor to be used for monitoring of a state should only be an output signal on which checking of an operating condition of a rotary machine and facilities can be based, and examples thereof include signals indicating vibration, sound, a temperature, load torque, and motor power.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST 10 tested apparatus; 20 vibration sensor; 100 state monitoring apparatus; 110 A/D converter; 120 data obtaining unit; 130 storage device; 140 data computation unit; 142 training unit; 144 threshold value storage; 146 anomaly score calculator; 148 discriminant unit; 150 display

The invention claimed is:

1. A state monitoring method comprising:
a first step of obtaining a plurality of pieces of first measurement data of a first time length at timings different from one another from a sensor provided in a tested target while the tested target is normal;
a second step of obtaining a plurality of pieces of second measurement data of the first time length at timings different from one another when the tested target is diagnosed;
a third step of randomly selecting a plurality of pieces of training data from the plurality of pieces of first measurement data;
a fourth step of randomly selecting a plurality of pieces of test data from the plurality of pieces of second measurement data;
a fifth step of dividing each of the plurality of pieces of training data into pieces of segment data of a second time length shorter than the first time length and preparing a first feature value vector including a plurality of feature values for each divided piece of segment data;
a sixth step of preparing a classification boundary between normal and anomaly and an anomaly discriminant threshold value from a plurality of first feature value vectors prepared for each piece of segment data for the plurality of pieces of training data;
a seventh step of dividing each of the plurality of pieces of test data into pieces of segment data of the second time length and preparing a second feature value vector including a plurality of feature values for each divided piece of segment data;
an eighth step of calculating an anomaly score representing a distance from the classification boundary for the second feature value vector and calculating, for each of the plurality of pieces of test data, an anomaly ratio representing a ratio of a number of anomaly scores of the second feature value vectors exceeding the anomaly discriminant threshold value to a total number of the second feature value vectors; and
a ninth step of repeating the third to eighth steps a plurality of times, and when an average value of obtained anomaly ratios exceeds a prescribed value, displaying a result of discriminating the tested target as being abnormal.

2. A state monitoring method comprising:
a first step of obtaining a plurality of pieces of first measurement data of a first time length at timings different from one another from a sensor provided in a tested target while the tested target is normal;
a second step of obtaining a plurality of pieces of second measurement data of the first time length at timings different from one another when the tested target is diagnosed;
a third step of randomly selecting a plurality of pieces of training data from the plurality of pieces of first measurement data;
a fourth step of randomly selecting a plurality of pieces of test data from the plurality of pieces of second measurement data;
a fifth step of preparing a third feature value vector by dividing each of the plurality of pieces of training data into pieces of segment data of a second time length shorter than the first time length, preparing a first feature value vector including a plurality of feature values for each divided piece of segment data, and handling together the first feature value vectors of a plurality of successive pieces of the segment data;
a sixth step of preparing a classification boundary between normal and anomaly and an anomaly discriminant threshold value from a plurality of third feature value vectors prepared for each set of the plurality of successive pieces of the segment data for the plurality of pieces of training data;
a seventh step of preparing a fourth feature value vector by dividing each of the plurality of pieces of test data into pieces of segment data of the second time length, preparing a second feature value vector including a plurality of feature values for each divided piece of segment data, and handling together the second feature value vectors of a plurality of successive pieces of segment data;
an eighth step of calculating an anomaly score representing a distance from the classification boundary for the fourth feature value vector and calculating, for each of the plurality of pieces of test data, an anomaly ratio representing a ratio of a number of anomaly scores of the fourth feature value vectors exceeding the anomaly discriminant threshold value to a total number of the fourth feature value vectors; and
a ninth step of repeating the third to eighth steps a plurality of times and when an average value of obtained anomaly ratios exceeds a prescribed value, displaying a result of discriminating the tested target as being abnormal.

3. A state monitoring method comprising:
a first step of obtaining a plurality of pieces of first measurement data of a first time length at timings different from one another from a sensor provided in a tested target while the tested target is normal;
a second step of obtaining a plurality of pieces of second measurement data of the first time length at timings different from one another when the tested target is diagnosed;
a third step of randomly selecting a plurality of pieces of training data from the plurality of pieces of first measurement data;
a fourth step of randomly selecting a plurality of pieces of test data from the plurality of pieces of second measurement data;
a fifth step of dividing each of the plurality of pieces of training data into pieces of segment data of a second time length shorter than the first time length and preparing, for each divided piece of segment data, a first feature value vector including each of a plurality of calculated feature values as a component;
a sixth step of preparing a second feature value vector for each piece of segment data by calculating an indicator value representing variation for each component of the first feature value vector, determining a component of which indicator value is smaller than a sampling threshold value as a component to be used, and sampling the component to be used from the first feature value vector;
a seventh step of preparing a classification boundary between normal and anomaly and an anomaly discriminant threshold value from a plurality of second feature value vectors prepared for each piece of segment data for the plurality of pieces of training data;
an eighth step of dividing each of the plurality of pieces of test data into pieces of segment data of the second time length and preparing, for each divided piece of segment data, a third feature value vector including each of the plurality of calculated feature values as a component;

a ninth step of preparing a fourth feature value vector for each piece of segment data by sampling the component to be used from the third feature value vector;

a tenth step of calculating an anomaly score representing a distance from the classification boundary for the fourth feature value vector and calculating, for each of the plurality of pieces of test data, an anomaly ratio representing a ratio of a number of anomaly scores of the fourth feature value vectors exceeding the anomaly discriminant threshold value to a total number of the fourth feature value vectors; and an eleventh step of repeating the third to tenth steps a plurality of times, and when an average value of obtained anomaly ratios exceeds a prescribed value, displaying a result of discriminating the tested target as being abnormal.

4. A state monitoring method comprising:

a first step of obtaining a plurality of pieces of first measurement data of a first time length at timings different from one another from a sensor provided in a tested target while the tested target is normal;

a second step of obtaining a plurality of pieces of second measurement data of the first time length at timings different from one another when the tested target is diagnosed;

a third step of randomly selecting a plurality of pieces of training data from the plurality of pieces of first measurement data;

a fourth step of randomly selecting a plurality of pieces of test data from the plurality of pieces of second measurement data;

a fifth step of preparing a second feature value vector by dividing each of the plurality of pieces of training data into pieces of segment data of a second time length shorter than the first time length, preparing, for each divided piece of segment data, a first feature value vector including each of a plurality of calculated feature values as a component, and handling together the first feature value vectors of a plurality of successive pieces of the segment data;

a sixth step of preparing a third feature value vector for each set of the plurality of successive pieces of the segment data by calculating an indicator value representing variation for each component of the second feature value vector, determining a component of which indicator value is smaller than a sampling threshold value as a component to be used, and sampling the component to be used from the second feature value vector;

a seventh step of preparing, for the plurality of pieces of training data, a classification boundary between normal and anomaly and an anomaly discriminant threshold value from a plurality of the third feature value vectors prepared for each set of the plurality of successive pieces of the segment data;

an eighth step of preparing a fifth feature value vector by dividing each of the plurality of pieces of test data into pieces of segment data of the second time length, preparing, for each divided piece of segment data, a fourth feature value vector including each of a plurality of calculated feature values as a component, and handling together the fourth feature value vectors of a plurality of successive pieces of the segment data;

a ninth step of preparing a sixth feature value vector for each set of the plurality of successive pieces of the segment data by sampling the component to be used from the fifth feature value vector;

a tenth step of calculating an anomaly score representing a distance from the classification boundary for the sixth feature value vector and calculating, for each of the plurality of pieces of test data, an anomaly ratio representing a ratio of a number of anomaly scores of the sixth feature value vectors exceeding the anomaly discriminant threshold value to a total number of the sixth feature value vectors; and an eleventh step of repeating the third to tenth steps a plurality of times and when an average value of obtained anomaly ratios exceeds a prescribed value, displaying a result of discriminating the tested target as being abnormal.

5. The state monitoring method according to claim 3, wherein the indicator value is a coefficient of variance.

6. A state monitoring apparatus diagnosing the tested target by using the method described in claim 5.

7. The state monitoring method according to claim 4, wherein the indicator value is a coefficient of variance.

8. A state monitoring apparatus diagnosing the tested target by using the method described in claim 7.

9. A state monitoring apparatus diagnosing the tested target by using the method described in claim 1.

10. A state monitoring apparatus diagnosing the tested target by using the method described in claim 2.

11. A state monitoring apparatus diagnosing the tested target by using the method described in claim 3.

12. A state monitoring apparatus diagnosing the tested target by using the method described in claim 4.

* * * * *